(12) United States Patent
Chung

(10) Patent No.: US 11,687,957 B2
(45) Date of Patent: Jun. 27, 2023

(54) MOBILE CLOUD AND MOBILE CLOUD COMPUTING FOR A USER-CUSTOMIZED SURVEY OR ELECTION SERVICE SYSTEM AND METHOD

(71) Applicant: Neopad Inc., Seoul (KR)

(72) Inventor: Hee Sung Chung, Seoul (KR)

(73) Assignee: NEOPAD INC., Seoul (KR)

( * ) Notice: Subject to any disclaimer, the term of this patent is extended or adjusted under 35 U.S.C. 154(b) by 217 days.

(21) Appl. No.: 17/007,255

(22) Filed: Aug. 31, 2020

(65) Prior Publication Data

US 2020/0401631 A1 Dec. 24, 2020

Related U.S. Application Data

(63) Continuation-in-part of application No. 15/705,391, filed on Sep. 15, 2017, now abandoned, which is a continuation-in-part of application No. 13/146,106, filed as application No. PCT/KR2010/000665 on Feb. 3, 2010, now abandoned.

(30) Foreign Application Priority Data

Feb. 4, 2009 (KR) .................. 10-2009-0008745

(51) Int. Cl.
  *G06Q 30/02* (2012.01)
  *G06F 16/93* (2019.01)
  *G06F 16/958* (2019.01)
  *G07C 13/00* (2006.01)
  (Continued)

(52) U.S. Cl.
  CPC ......... *G06Q 30/0203* (2013.01); *G06F 16/93* (2019.01); *G06F 16/986* (2019.01); *G07C 13/00* (2013.01); *H04L 67/10* (2013.01)

(58) Field of Classification Search
  CPC ................ G06F 16/00–986; H04L 67/00–75
  See application file for complete search history.

(56) References Cited

U.S. PATENT DOCUMENTS

5,930,804 A   7/1999   Yu et al.
6,973,581 B2  12/2005  Chung et al.
(Continued)

FOREIGN PATENT DOCUMENTS

KR   2001-0103820 A    11/2001
KR   10-2001-0110264 A  12/2001
(Continued)

OTHER PUBLICATIONS

Google, "Create a survey using Google Forms", https://support.google.com/docs/answer/87809?hl=en, 2017.
(Continued)

*Primary Examiner* — Mohammad A. Nilforoush
(74) *Attorney, Agent, or Firm* — WHDA, LLP

(57) ABSTRACT

Mobile cloud and mobile cloud computing for a user-customized survey or election service system and method are provided. The mobile cloud and mobile cloud computing-based user-customized survey or election service provides an editor's metadata frame for creating user-customized survey or election service contents to information devices including user's smartphone from a service server and a metadata description frame database for generating the editor's metadata frame and storing the user's contents to the service server.

6 Claims, 26 Drawing Sheets

(51) Int. Cl.
*G06Q 30/0203* (2023.01)
*H04L 67/10* (2022.01)

(56) References Cited

U.S. PATENT DOCUMENTS

| | | | |
|---|---|---|---|
| 2003/0208395 A1 | 11/2003 | McClure et al. | |
| 2004/0030687 A1 | 2/2004 | Hidaka et al. | |
| 2004/0128183 A1* | 7/2004 | Challey | G06Q 30/02 705/7.32 |
| 2005/0043988 A1 | 2/2005 | Illsey et al. | |
| 2005/0218224 A1 | 10/2005 | Boldin | |
| 2008/0290163 A1 | 11/2008 | Strabone | |
| 2009/0055725 A1 | 2/2009 | Portnov | |
| 2011/0055327 A1* | 3/2011 | Schoech | G06Q 50/205 709/204 |
| 2014/0278781 A1* | 9/2014 | Liu | G06Q 30/0203 705/7.32 |

FOREIGN PATENT DOCUMENTS

| | | |
|---|---|---|
| KR | 10-2002-0003269 A | 1/2002 |
| KR | 2002-0055734 A | 7/2002 |
| KR | 2002-0078813 A | 10/2002 |
| KR | 2003-0056259 A | 7/2003 |
| KR | 10-2004-0083258 A | 10/2004 |
| KR | 10-0225-0006573 A | 1/2005 |
| KR | 10-2005-0001975 A | 1/2005 |
| KR | 10-2005-0102046 A | 10/2005 |
| KR | 10-2005-0102051 A | 10/2005 |
| KR | 10-2006-0068884 A | 6/2006 |
| KR | 10-2006-0095215 A | 8/2006 |
| KR | 10-2006-0098671 A | 9/2006 |
| KR | 10-2007-0046314 A | 5/2007 |
| KR | 10-2008-0007949 A | 1/2008 |
| KR | 10-2008-0040932 A | 5/2008 |
| KR | 10-2008-0099165 A | 11/2008 |

OTHER PUBLICATIONS

Microsoft, "Surveys in Excel, hosted online", https://support.office.com/en-us/article/Surveys-in-Excel-hosted-online-5FAFD054-19FB-474C-97EC-B606FCDA0FF9, 2017.
Translated of the International Search Report dated Aug. 19, 2010.
JasonMorrison.net, "Create a survey or poll for your blog with Google Docs and Spreadsheets", http://www.jasonmorrison.net/content/2008/create-a-survey-or-poll-for-your-blog-with-google-docs-and-spreadsheets/, 2020. (6 pages).
Teacherlink, "Tutorial-Collecting Data using Google Forms", http://teacherlink.ed.usu.edu/tlresources/training2/google/googleforms.pdf, 2020. (3 pages).
Surveymonkey, "A global leader in survey software. 20 million questions answered daily", https://www.surveymonkey.com/, 2020. (12 pages).
Wikipedia, "Google Surveys", https://en.wikipedia.org/wiki/Google_Surveys, 2020. (4 pages).
Google, "Collect and organize information big and small with Google Forms. For free. The Google Forms you love with added security and control for teams.", https://www.google.com/forms/about/, 2020. (6 pages).
Wikipedia, "Microsoft Forms", https://en.wikipedia.org/wiki/Microsoft_Forms, 2020. (1 page).
Microsoft, "Microsoft Forms, Easily create surveys, Quizzes, and polls.", https://forms.office.com/, 2020. (8 pages).

* cited by examiner

FIG. 5

| VOTE TITLE |
| --- |
| MANAGER |
| ELECTION DATE |
| SYMBOL |
| NAME OF CANDIDATE |
| AGE OF CANDIDATE |
| PARTY OF CANDIDATE |
| ACADEMIC RECORDS |
| CAREER OF CANDIDATE |
| PHOTO OF CANDIDATE |

FIG. 7

| VOTE TITLE | 8^(TH) PARLIAMENTARY ELECTION | |
|---|---|---|
| ELECTION DATE | APRIL 7, 2012 | |
| SYMBOL | NAME | VOTE COLUMN |
| 1 | LEE MONG YONG | |
| 2 | KIM CHEOL SOO | |
| 3 | LEE YOUNG HEE | |
| 4 | PARK YOUNG SEOK | |
| 5 | CHOI JIN SOO | |
| 6 | JUNG SUNG HOON | |
| 7 | HA DONG SOO | |

FIG. 8

| VOTE TITLE | 8^(TH) PARLIAMENTARY ELECTION | |
|---|---|---|
| ELECTION DATE | APRIL 7, 2012 | |
| SYMBOL | NAME | VOTE COLUMN |
| 1 | LEE MONG YONG | Ⓧ |
| 2 | KIM CHEOL SOO | |
| 3 | LEE YOUNG HEE | |
| 4 | PARK YOUNG SEOK | |
| 5 | CHOI JIN SOO | |
| 6 | JUNG SUNG HOON | |
| 7 | HA DONG SOO | |

FIG. 10

| TITLE |
| MANAGER |
| QUESTION1 |
| QUESTION2 |
| ... |
| RESPONDENT |
| DATE OF RESPONSE |

FIG. 11

| TITLE |
|---|
| MT OPINION SURVEY |
| MANAGER |
| STUDENT COUNCIL |
| QUESTION1 |
| • WHERE DO YOU WANT TO GO FOR NEW TERM MT? |
| • GANGCHON<br>• MT. SONGNI<br>• ANMYEON ISLAND<br>• MT. MAI |
| QUESTION2 |
| • CHOOSE MT DATE |
| • APRIL 5<br>• APRIL 10<br>• APRIL 15 |
| • • • |
| RESPONDENT |
| LEE MONG YONG |
| DATE OF RESPONSE |
| 2012. ○. ○ |

FIG. 12

| RESPONSE COLLECTING PAPER ||
|---|---|
| TITLE | MT OPINION SURVEY |
| DATE | 2012. ○. ○ |
| QUESTION1 | ○ ○ ○ ○ |
| QUESTION2 | ○ ○ ○ |
| ... | ... |

FIG. 13

| RESPONSE COLLECTING PAPER ||
|---|---|
| TITLE | MT OPINION SURVEY |
| DATE | 2012. ○. ○ |
| QUESTION1 | ○ ⊙ ○ ○ |
| QUESTION2 | ○ ○ ⊙ |
| ... | ... |

FIG. 16

```
<rdf:RDF xmlns ..>
<rdf:Description rdf: about="ELECTION VOTING">
    <ex:TYPE>
        <rdf:Description>
            <ex:ELECTION FOR MEMBER OF NATIONAL ASSEMBLY>
                <ex:MANAGER>[_____]</ex:MANAGER>
                <ex:CANDIDATE>
                    <ex:SYMBOL>[_____]</ex:SYMBOL>
                    <ex:CANDIDATE NAME>[_____]</ex:CANDIDATE NAME>
                    <ex:CANDIDATE AGE>[_____]</ex:CANDIDATE AGE>
                    <ex:CANDIDATE PARTY>[_____]</ex:CANDIDATE PARTY>
                    <ex:CANDIDATE ACADEMIC RECORDS>[_____]</ex:CANDIDATE ACADEMIC RECORDS>
                    <ex:CANDIDATE CAREER>[_____]</ex:CANDIDATE CAREER>
                    <ex:CANDIDATE PHOTO>[_____]</ex:CANDIDATE PHOTO>
                </ex:CANDIDATE>
            </ex:ELECTION FOR MEMBER OF NATIONAL ASSEMBLY>
        </rdf:Description>
    </ex:TYPE>
</rdf:Description>
</rdf:RDF>
```

FIG. 17

| ELECTION VOTING TITLE | MANAGER | CANDIDATE | | | | | | |
|---|---|---|---|---|---|---|---|---|
| | | SYMBOL | MANAGER NAME | CANDIDATE AGE | CANDIDATE PARTY | CANDIDATE ACADEMIC RECORDS | CANDIDATE CAREER | CANDIDATE PHOTO |
| ELECTION FOR MEMBER OF NATIONAL ASSEMBLY | PARLIAMENTARY ELECTION MANAGEMENT COMMITTEE | | | | | | | |
| | | | | | | | | |
| | | | | | | | | |
| | | | | | | | | |

FIG. 20

```
<rdf:RDF xmlns ..>
    <rdf:Description rdf: about="SURVEY">
        <ex:TYPE>
            <rdf:Description>
                <ex:OPINION SURVEY>
                    <ex:TITLE>[_____]</ex:TITLE>
                    <ex:DATE>[_____]</ex:DATE>
                    ... ...
                    <ex:QUESTION>
                        <ex:QUESTION L>[_____]</ex:QUESTION L>
                        <ex:RESPONSE I>[_____]</ex:RESPONSE I>
                        ... ...
                    </ex:QUESTION>
                </ex:OPINION SURVEY>
            </rdf:Description>
        </ex:TYPE>
    </rdf:Description>
</rdf:RDF>
```

FIG. 21

| TITLE | DATE | QUESTION |
|---|---|---|
| | | QUESTION1 |
| | | RESPONSE1 |
| | | QUESTION2 |
| | | RESPONSE2 |
| | | ... |
| | | ... |

FIG. 22

```
<rdf:RDF xmlns ..>
    <rdf:Description rdf: about=ELECTION SURVEY>
        <ex:VOTE TITLE>8TH PARLIAMENTARY ELECTION</ex:VOTE TITLE>
        <ex:ELECTION DATE>APRIL 7, 2012 <ex:ELECTION DATE>
        <ex:CANDIDATE>
            <ex:SYMBOL>1
            <ex:NAME>LEE MONG YONG</ex:NAME>
            <ex:VOTE COLUMN>O </ex:VOTE COLUMN>
            <ex:SYMBOL>2
            <ex:NAME>KIM CHEOL SOO</ex:NAME>
            <ex:VOTE COLUMN>O </ex:VOTE COLUMN>
                ... ...
        </ex:CANDIDATE>
    </rdf:Description>
</rdf:RDF>
```

FIG. 27

```
CREATE DATABASE sample1
CREATE TABLE sample11
(id
title varchar(30) NOT NULL,
question varchar(100) NOT NULL
answer varchar(100) NOT NULL
answertype int NOT NULL
date date
manager varchar(30) NOT NULL
,
,
) ENGINE=innoDB DEFAULT CHARSET=utf8
```

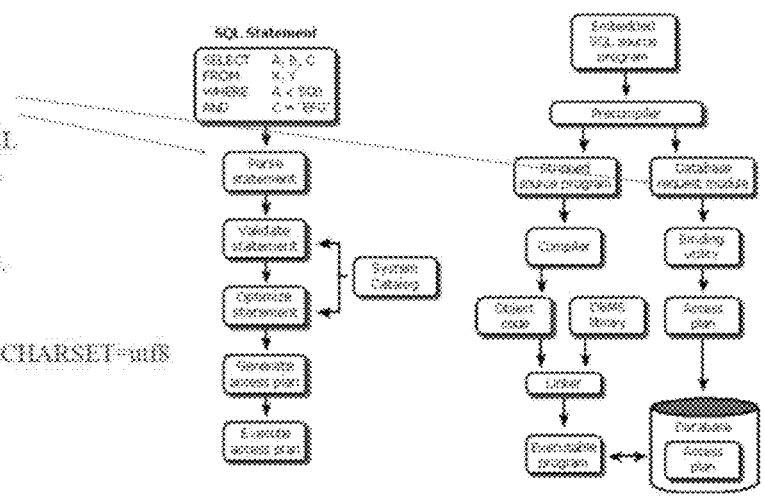

FIG. 28

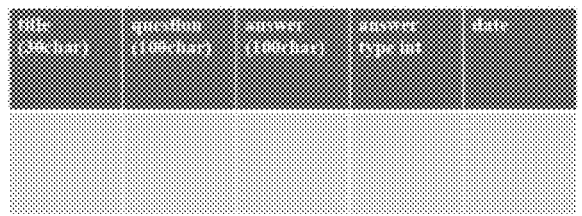

```
CREATE DATABASE sample1
CREATE TABLE sample11
(id
title varchar(100) NOT NULL,
question varchar(100) NOT NULL
answer varchar(100) NOT NULL
answertype int NOT NULL
date date
manager varchar(30) NOT NULL
,
,
) ENGINE=innoDB DEFAULT CHARSET=utf8
```

MOBILE CLOUD AND MOBILE CLOUD COMPUTING FOR A USER-CUSTOMIZED SURVEY OR ELECTION SERVICE SYSTEM AND METHOD

CROSS-REFERENCE TO RELATED APPLICATION

The present invention is a CIP application of U.S. patent Ser. No. 15/705,391 filed on Sep. 15, 2017, which is a CIP application of U.S. patent application Ser. No. 13/146,106 filed on Oct. 10, 2011. This application claims priorities from Korea Patent Application No. 10-2009-0008745 filed on Feb. 4, 2009 and PCT Patent Application No. PCT/KR2010/000665 filed on Feb. 3, 2010, all of which are incorporated herein by reference in its entirety.

TECHNICAL FIELD

The present invention relates to a system and a method for user-customized survey or election service. More particularly, the present invention relates to a system and a method for the user-customized survey or election service by compiling statistics with users' opinions collected through voting, public opinion polls, surveys, and other feedback and providing the user opinions.

BACKGROUND ART

When an election/voting process and a public opinion poll are largely divided, the election part includes organizing information of a candidate running for a particular election, promoting and opening to election participants, managing voters, drawing and managing voting results, and the voting participant demands for accurate and prompt information about the candidate from an election administrator and to guarantee an unrestricted voter environment. Meanwhile, the public opinion poll is largely divided into determining and suggesting question items in a field to survey, determining and suggesting response items for each question item, selecting responses of respondents, and compiling and managing statistics with the survey results.

In most of current election votes, the information of the candidate is opened mainly using a poster of a paper medium or a banner, and a representative election voting is an analogue voting where the voter attends a certain place within a certain time period and casts a vote in person.

As such, the current representative voting method not only takes considerable expenses economically but also increases an abstention rate according to physical movement of the voter who is under physical limitation, and thus the election voting method needs to be enhanced.

Meanwhile, a representative opinion survey for a specific purpose is a public opinion poll. Since the current public opinion polling method mainly performs a method for responding to a questionnaire made of paper, a survey method according to question and answer over the phone, or an approach via a polling service provider, the physical limitation on the questioner and the respondent is great and a service technique manageable directly by users including the manager is not developed.

Korean Patent Publication No. 2005-0102046 (ELECTRONIC VOTING AND ELECTION SYSTEM) is an electronic voting system which includes a voter ID confirmation terminal for identifying a voter by searching an integrated voter register DB or a unit voter register DB connected through a network, and storing voting to the integrated voter register DB or the unit voter register DB in real-time when the identification of the voter and the duplicated voting are successfully checked by the ID confirmation means, an electronic voting ticket issuer for issuing an electronic voting ticket capable of displaying election and election district information, and an images of a relevant election district and candidate combination and erasing the stored information after completing the voting, and an electronic voting machine operated in an offline method independent of the integrated voter register confirmation DB, guiding the voter in a voting procedure when the voter inserts the electronic voting ticket, and storing a voting result of the voter. The electronic voting machine includes a candidate information storing medium for storing the image of the candidate combination registered to all of the voting districts of the nation, a display device for displaying the image of the candidate combination of the district of the voter stored to the candidate information storing medium based on the information stored to the electronic voting card, an input device for selecting one of the candidates displayed in the display device, a voting result storage device for storing the voting result, and an output device for printing and outputting the voting result to a voting recording paper.

Korean Patent Publication No. 10-2005-0102051 (ELECTRONIC VOTING SYSTEM USING INTERNET) is an electronic voting system including a candidate information storage device which stores an image of a candidate group registered to an election district, an integrated voter register DB which stores voter information integrated in a national or regional unit, a certification center which performs identification of the voter who uses a terminal connected through the Internet through electronic authentication based on the voter information, and a web server which provides the voter certified by the certification center with a candidate selection web screen including the image of the candidate group, and transmits the voting result through the web screen, as an election management system for counting and collecting an election result per election or per election district.

Korean Patent Publication No. 10-2005-0001975 (ELECTRONIC VOTING SYSTEM AND ELECTRONIC VOTING METHOD USING ID-BASED BLIND SIGNATURE) is an electronic voting system using ID-based blind signature, including a certification authority server for inserting the signature into an electronic vote sheet with a voter certification in a state that contents of the received electronic vote sheet are unknown according to an ID-based blind signature method and transmitting it to a voter terminal; a collection server for verifying the vote by collecting the electronic vote sheet containing the signature during a vote time; and a voter terminal for transmitting the vote sheet blinding and encrypting vote contents by using the ID-based blind signature to the certification authority server, and encrypting and transmitting the vote sheet to the collection server without blinding the vote sheet when the electronic vote sheet containing the signature is received from the certification authority server.

Korean Patent Publication No, 10-2008-0040932 (DEVICE AND METHOD OF E-VOTING USING MOBILE TERMINAL) is an e-voting device including a voter ID checker which authenticates a voter based on a certificate received from a mobile terminal of the voter through a mobile network; an encoding key manager which generates and transmits an encoding key for encoding voting contents to the mobile terminal; a voting information provider which transmits voting information including election candidates to the mobile terminal; and a voting result storing part which decodes and stores the encoded voting contents of which ID information of the voter is removed from the encoded voting contents including voting result information of the voter based on the voting information.

Korean Patent Publication No. 10-2008-0099165 (ELECTION MANAGEMENT METHOD AND ELECTION MANAGEMENT SERVER IN NETWORK USING PERSONAL TERMINAL) is an election management method in a network using a personal terminal, including the steps of storing, at an election managing server, identification information of each voter required for wired/wireless communication with each voter; sending, at the election managing server, certain URL information to voter terminals used by the voters through the identification information of each voter; receiving, at the election managing server, voting information from the voter terminal connected to the certain URL; generating, at the election managing server, a first password code by inputting the voting information and the identification information of the voter received from the voter terminal into a first function; generating, at the election managing server, a second password code by inputting the first password code to a second function; and storing the generated second password code together with the voting information.

Korean Patent Publication No. 10-2008-0007949 (SYSTEM FOR FURNISHING ELECTION POSTER IN ONLINE AND METHOD THEREOF) is an on-line election poster furnishing system including a central election manager server which computerizes and stores candidate information and election posters including a candidate name, an election type, an election area, academic records, careers, and election pledges of each election candidate submitted to an election management agent, to a database, stores election information including an election schedule, a polling place, a voting procedure, and election related news to the database, and selectively provides the information stored in the database to a cyber election poster management server; and the cyber election poster management server which provides a site for providing the candidate information and the election information, and searches for and provides the candidate information and the election poster of a particular candidate by accessing to the central election management server according to a request of a user terminal.

Korean Patent Publication No. 10-2003-0056259 (METHOD AND SYSTEM OF PERFORMING AN ELECTION CAMPAIGN BASED ON INFORMATION USING WIRED/WIRELESS COMMUNICATION NETWORKS) is a method for performing an election campaign based on information of voters using wired/wireless communication networks. The election campaign method based on the voter information using the communication network includes storing the voter information, storing candidate PR information which is contents provided to the voter from the candidate, generating and storing an information provision voter selection code per item for searching the voter to transmit the item according to the candidate PR information item, storing a forwarding condition to forward the candidate PR information, and searching for the voter to receive the PR information item matched with the information provision voter selection code when the forwarding condition is satisfied, and forwarding the PR information to the searched voter.

Korean Patent Publication No. 10-2002-0055734 (METHOD AND SYSTEM FOR EXIT POLL BY USING MOBILE TELECOMMUNICATION DEVICES) is an exit poll method using a mobile telecommunication device which includes a position information service center for locating a user, an election exit poll server for performing the election exit poll based on the position information of the user, and a short message service center for processing a short message for the election exit poll. The exit poll method using the mobile telecommunication devices includes receiving position information of a user according to voting areas from a position information service center; creating a short message for the election exit poll according to corresponding voting area based on the position information of the user transmitted per voting area and transmitting the short message to the short message service center; transmitting the transmitted short message to a wireless modem or a wireless communication device of a corresponding user using a wireless data network; transmitting user response data with respect to the short message to the election exit poll server; and creating an elected candidate state according to voting areas of the user based on the transmitted response data.

Korean Patent Publication No. 2001-0103820 (PUBLIC-OPINION POLL USING WAP-BASED WIRELESS INTERNET TERMINAL) is a method for joining a plurality of subscribers having a WAP-based wireless Internet terminal and subscribed as a public opinion poll member, to members. The system and the method conduct the public-opinion pull using all of media including sound, picture, character, and video reproduced by the terminal by including the subscription via the wired Internet including a home page operated by a public-opinion poll agency together with the direct subscription over the wireless Internet using the terminal.

Korean Patent Publication No. 2002-0078813 (METHOD FOR SEARCHING PUBLIC OPINION USING MOBILE TERMINAL) is a method for surveying public opinion using a mobile terminal, including storing, at a certain requester of the public opinion survey, data of a wanted public opinion survey to a web server, extracting, at a mobile communication company, a group adapted to the survey, requesting mobile terminals of the extracted group to respond to the survey, connecting, at the mobile terminal user, to the web server using a web browser stored in the mobile terminal and responding to the survey, and supplying, at the mobile communication company, a predetermined commission to a charged account of the terminal user who responded to the survey.

Korean Patent Publication No. 2006-0095215 (ELECTRONIC VOTING SYSTEM USING MOBILE COMMUNICATION TERMINAL AND METHOD THEREOF) is an electronic voting system using a mobile communication terminal, including a plurality of voter terminals which receive and display a voting case short message, and generate and send voting response short messages when voting responses are received from voters, an add-up terminal which transmits the voting case short message for a voting case to the voters who will participate in voting, and receives the voting response short messages from the voters to add up and count voting results, and a short message service center which provides a short message transmission and reception service between the voter terminals and the add-up terminal.

Korean Patent Publication No. 2006-0068884 (METHOD AND SYSTEM FOR PUBLIC OPINION SURVEY SERVICE USING MOBILE COMMUNICATION NETWORK) is a public opinion survey service using a mobile communication network, including checking whether a mobile communication service subscriber participates in the public opinion survey and receiving a result through a mobile communication terminal, storing users agreeing to the participation in the public opinion survey, extracting a response panel sample of an intended public opinion survey from the stored users agreeing to the participation in the public opinion survey, storing the extracted response panel sample, requesting to respond to the public opinion survey through mobile communication terminals of a response panel corresponding to the stored response panel sample using a mobile communication network, transmitting public opinion survey questions to the mobile communication terminals of the response panel agreeing to the public opinion survey response request, receiving responses for the public opinion survey from the mobile communication terminal, and storing the received responses of the response panel.

Korean Patent Publication No. 2006-0098671 (CYBER PUBLIC OPINION RESEARCH SYSTEM AND METHOD) is a cyber public opinion research system for searching and collecting writings including a preset keyword by accessing to other sites of Internet network. The cyber public opinion research system includes a web server for approving as a member by receiving member information from a client who wants to request the public opinion research, receiving and storing a keyword for the public opinion research to a data collection server, displaying the collected and stored writings to check a valuation per level according to preference or non-preference, and applying a preset weight to the writings evaluated per level and calculating a public opinion index by considering hits; the data collection server for collecting questions and replies including the corresponding keyword without overlap by connecting to a knowledge search webpage of a portal site with the registered keyword, storing the writings per item (data source, written when, written by, hits, contents (question/reply)), and storing contents by classifying the contents into the question and the reply; and a search server for outputting the same result as the search for all portal sites by searching and inquiring the data stored to the data collection server.

Korean Patent Publication No. 2007-0046314 (SYSTEM FOR PERFORMING PUBLIC-OPINION POLL USING MOBILE COMMUNICATION NETWORK AND METHOD THEREOF) is a public-opinion poll system using a mobile communication network and Internet. The public-opinion poll system using the mobile communication network includes a mobile terminal including a camera and transmitting a subscriber face image pre-captured by the camera, a web server for transmitting a public-opinion poll participation message to the mobile communication terminal by accessing the mobile communication network and the Internet, transmitting the public-opinion poll question message only to the terminal responding to the public-opinion poll participation message in the mobile communication terminal, and then receiving the captured subscriber face image data from the mobile communication terminal, and a public-opinion poll server for checking blink time and counts in the subscriber face image data received from the mobile communication terminal, converting a checking result into response data of the public opinion poll, and generating public-opinion poll result data by analyzing the response data of the collected public opinions.

Current methods of collecting public opinions involve having an opinion collecting server, which is connected to various opinion inputting terminals through a network. Here, a spread sheet is used as its file system. Collecting and storing user opinions and analyzing statistics of the collected user opinions are performed with the spread sheet. Therefore, survey results are provided to users only. FIG. 23 is a diagram of a system for automatically collecting opinions based on a spread sheet as its file system. However, this spread sheet-based opinion collecting system has a drawback in that this is a closed system, in which any information or data related to the survey cannot be shared with other users. Therefore, there is a need to have a system, in which information or data related to the survey can be shared with other users and monitored in real time.

Meanwhile, anyone at anytime and anywhere needs a technology that can easily and economically use user-customized or personalized survey and election service using portable information devices including smartphones, that is, user-customized survey or election using mobile cloud environment technology.

Mobile cloud is Internet-based data, applications, and related services accessed through smartphones, laptop computers, tablets and other portable devices.

Mobile cloud computing (MCC) is defined as a package that contains the combination of cloud technology, mobile computing, and wireless network. This combinational package brings enormous computational resources to cell phone users, network operators as well as cloud technology providers. Furthermore, the MCC enables rich mobile execution on mobile devices, which will be enriched with best user experience (UI).

Mobile cloud applications are defined as software that is programmed to be accessed over the Internet by various portable computing devices. There are two types of mobile cloud applications that are almost similar. These are: mobile cloud apps & mobile web apps. Both of them run on the mobile device's external server and data are stored externally and are accessed by a browser over the Internet.

Mobile cloud and web apps are both very different from native mobile apps. Native apps in mobile software development run on one particular mobile device or platform and are downloaded and installed on the mobile device. For the native mobile apps, developers must create three different versions of the same mobile app if they want it to be used by iOS, Android and Windows devices. Because mobile cloud apps are not downloaded, developers can just write one version of their mobile app, and any device with a browser and Internet connection can use it.

The conventional technology does not provide a user editor to generate user personalized or customized contents in a survey or election services based on mobile cloud.

In addition, the conventional technology does not provide an editor for creating a user-customized survey or poll contents and a database capable of storing and sharing the generated user-customized survey or election service contents. As a result, the conventional technology is not able to provide survey or election services to meet the needs of various areas of users. The conventional technology does not have a database management system to support the entire process of survey or poll services. Therefore, the conventional technology provides high-cost and low-efficiency services. In particular, technology for conducting the user-customized surveys or election services based on the mobile cloud computing in web/app-based mobile devices has not been provided.

DETAILED DESCRIPTION OF THE INVENTION

Technical Object of the Invention

To address the above-discussed deficiencies, an aspect of the present invention is to a system and a method for automatically collecting opinions such that a manager (or a user) in person can automatically collect user opinions required for voting, public opinion polls, surveys, and other feedback on line through PCs or portable communication equipment with an easy user interface and automatically compile statistics with the collected user opinions.

In addition, another aspect of the present invention is to a system and a method for automatically collecting opinions based on web with functions allowing a manager (or a user) to directly manage related information and procedure and to search for related information.

Specifically, the purposes of the present invention are as follows:

First, the present invention is to provide a user's editor to create a direct user-customized survey or election contents suitable for their use to the user.

Second, the present invention is to provide a method for constructing a database system for the user-customized survey or election service.

Third, the present invention is to provide the user-customized survey or election service based on the mobile cloud and the mobile cloud computing.

In the following description, opinion collecting or voting service is synonymous with survey or election service. An opinion collecting server means a service server.

Here, the 'user-customized' means a free format content that the user can freely produce and generate according to the user's survey or election purposes.

In the present application, a metadata frame refers to a data model for designing a metadata description frame database of the user-customized survey or election service system, and an editor's metadata frame refers to a user interface of a content generator.

Construction and Operation of the Invention

According to one aspect of the present invention, a method of the user-customized survey or election service includes generating an editor's metadata frame comprising metadata items required for an opinion collecting service; generating contents comprising actual metadata corresponding to metadata items contained in the metadata frame; distributing the contents to a user terminal; receiving the reply contents from the user terminal in response to the contents; extracting user's opinion contained in the reply contents and compiling statistics; and providing a result of the statistics compiling.

The method and system of the user-customized survey or election service is performed in mobile cloud and mobile cloud computing environment with the server and the information devices including the user's mobile phone.

The user-customized survey or election service is performed in mobile cloud and mobile cloud computing environment with the server and the information devices.

The user-customized survey or election service can be provided to the user's information devices as a mobile cloud app or a native app.

The method may further include authenticating whether a rightful manager accesses a server which performs the opinion collecting service, and the metadata frame generating step may be performed when the authenticating step confirms that the rightful manager accesses.

The authentication may be performed using at least one of 1) ID/PW check, 2) authentication using a certificate or a digital signature, 3) verification using an authentication card and/or a USB memory, and 4) identification using biometric information, and the biometric information may include at least one of a photo, voice, a fingerprint, and an iris.

The biometric information may be obtained through a device equipped or connected to a server which conducts the opinion collecting service.

The contents may include at least one of contents comprising information to refer to before opinion decision, and contents used to input the determined opining after the opinion decision.

The user-customized survey or election service may be a service for collecting a voting result, the contents comprising the information to refer to before the opinion decision may be contents comprising information relating to a candidate, and the contents used to input the determined opining after the opinion decision may be contents which function as a ballot paper.

The user-customized survey or election service may be a service for collecting opinion, the contents comprising the information to refer to before the opinion decision may be contents comprising a question, and the contents used to input the determined opining after the opinion decision may be contents which function as a response collecting paper. The question may include at least one of a multiple-choice question and a short-answer question. The distributing step may selectively distribute the contents only to users which are opinion collecting targets.

The distributing step may distribute the contents with at least one of a mobile phone number, an IP address, and an E-mail address of the users of the opinion collecting target.

The method may further include storing the reply contents received in the receiving step.

The method may further include outputting a count state of the reply contents in real time.

The editor's metadata frame generating step may further include extracting metadata items required for an automatic opinion collecting service; generating and databasing the extracted metadata items as metadata description frames; extracting necessary metadata description frames from the databased metadata description frames; and generating an editor's metadata frame of a table type by converting the extracted metadata description frames.

The metadata item extracting step may extract the metadata items using according to an ontology scheme.

The databasing step may generate metadata description frames with the extracted metadata items using a description method according to at least one of a data model of Resource Description Framework (RDF), eXtensible Hyper Text Markup Language (XHTML), and eXtensible Markup Language (XML) database, and a spread sheet.

The method may further include generating a metadata description frame by reversely converting a reply metadata frame of the table type contained in the received reply contents, to a metadata description frame, and databasing the generated metadata description frame.

The method may further include searching for intended information in the databased metadata description frames.

According to another aspect of the present invention, a method of user-customized survey or election for inputting opinions includes showing opinion determining contents which contain information to refer to before opinion decision; receiving user opinion from a user using opinion inputting contents used to input the determined opinion after the opinion decision; generating reply contents containing the user opining input in the inputting step; and transmitting the reply contents.

The method may further include receiving the opinion determining contents and the opinion inputting contents from a server which performs an opinion collecting service, and the transmitting step may transmit the reply contents to the server.

The user-customized survey or election service may include at least one of a service for collecting a voting result and a service for collecting opinion.

The user-customized survey or election service may be a service for collecting the voting result, the contents comprising the information to refer to before the opinion decision may be contents comprising information relating to a candidate, and the contents used to input the determined opining after the opinion decision may be contents which function as a ballot paper.

The user-customized survey or election service may be a service for collecting opinion, the contents comprising the information to refer to before the opinion decision may be contents comprising a question, and the contents used to input the determined opining after the opinion decision may be contents which function as a response collecting paper.

The opinion inputting step may convert and show the opinion inputting contents to a user interface through which the user is able to input the opinion while reading, and then receive the user opinion from the user.

The method may further include authenticating whether the user is a rightful user for the opinion decision, and the transmitting step may be performed when the user is verified as the rightful user.

The authentication may be performed using at least one of 1) ID/PW check, 2) authentication using a certificate or a digital signature, 3) verification using an authentication card and/or a USB memory, and 4) identification using biometric information, and the biometric information may include at least one of a photo, voice, a fingerprint, and an iris.

The biometric information may be obtained through a device equipped or connected to a terminal which receives the user opinion.

According to yet another aspect of the present invention, a system of the user-customized survey or election service includes a service server for generating an editor's metadata frame comprising metadata items required for the user-customized survey or election service, generating contents comprising actual metadata corresponding to the metadata items contained in the editor's metadata frame, distributing the contents to the user terminal, receiving the reply contents from the user terminal in response to the contents, extracting user's opinion contained in the reply contents and compiling statistics, and providing a result of the statistics compiling; and an opinion inputting terminal for receiving user opinion from a user using the contents received from the opinion collecting server, generating reply contents containing the user opinion, and transmitting the reply contents to the service server.

The contents may include at least one of contents comprising information to refer to before opinion decision, and contents used to input the determined opining after the opinion decision.

The service server may extract metadata items required for the user-customized survey or election service, generate and database the extracted metadata items as metadata description frames, extracts necessary metadata description frames from the databased metadata description frames, and generate an editor's metadata frame of a table type by converting the extracted metadata description frames by a program complier.

The opinion collecting server may generate a metadata description frame by reversely converting a reply metadata frame of the table type contained in the received reply contents, to a metadata description frame, and database the generated metadata description frame.

Effect of the Invention

As set forth above, according to the present invention, it is possible to automatically collect on line the user opinions required for the voting, the public opinion poll, the survey, and other feedback through the PC or the portable communication equipment with the easy and convenient user interface, and to automatically compile the statistics with the collected user opinions. In addition, it is easy to stored retrieve the related information. Hence, by utilizing the system of the present invention as the web service, the voters or the researchers can conveniently and easily conduct the voting or the opinion survey activity anytime and anywhere without limitations on the physical place and the time, thus creating economic and social benefits.

Particularly, the manager (or the user) can produce economic and social benefits by automatically conducting the election promotion using the banner and the paper poster candidate promotion materials, the analog election/voting procedure and statistics limited to particular time and place, and the opinion public poll or the opinion survey using the questionnaire or the phone call, and directly using the Internet or the information device such as mobile phone without intervention of a service agent.

In particular, the advantageous effects of the present invention are as follows:

It is possible to share all information related to public opinions among users. For example, the database-based user-customized survey or election service system of the present invention enables all users to share contents, procedures, and results of all surveys conducted with users. However, the file system-based opinion collection does not provide such data sharing capability.

It is possible to store information regarding the survey logically in the database (database schema). However, the file system-based opinion collection does not provide such capability.

It is possible to monitor several surveys simultaneously and store/collect/analyze data in real time. However, the file system-based opinion collection does not provide such capability.

It is possible to easily search for all information related to previous surveys stored in the database with various search terms.

As described above, the mobile cloud and the mobile cloud computing-based user-customized survey or election service system of the present invention can provide a survey or election service and system using information devices such as a smartphone regardless of time and place.

It is possible to provide the mobile cloud apps, the mobile web apps-based or the native web-based and user-customized survey or election service having best user experience (UI).

The user's customized survey or election service of the present invention as a mobile cloud application can be built quickly as mobile cloud services and can deliver to many different devices with different operating systems.

The user's customized survey or election service based on the mobile app of the present invention that runs on the cloud is not constrained by a device's storage and processing resources. The user's customized survey or election service based on the mobile cloud computing of the present invention enables users to quickly and securely collect and integrate data from various sources, regardless of where it resides.

The user's customized survey or election service of the present invention based on mobile cloud computing provides flexibility to efficiently share processing and data storage between the device and the cloud to optimize performance and scalability.

The cloud-based user's customized survey or election service of the present invention guarantees the portability and convenience of mobile service.

THE BRIEF DESCRIPTION OF THE DRAWINGS

FIG. 1 is a diagram of a system for automatically collecting opinions according to an embodiment of the present invention, FIG. 2 is a detailed block diagram of an opinion collecting server of FIG. 1, FIG. 3 is a detailed block diagram of an opinion inputting terminal of FIG. 1, FIG. 4 is a flowchart of a method for collecting electronic voting results and providing an election result according to another embodiment of the present invention, FIG. 5 is a diagram of an example of a candidate information metadata frame, FIG. 6 is a diagram of an example of candidate information contents, FIG. 7 is a diagram of an example of ballot paper contents, FIG. 8 is a diagram of an example of reply contents generated in step S445 of FIG. 4, FIG. 9 is a flowchart of a method for collecting opinions using an electronic survey and providing a collected result according to another embodiment of the present invention, FIG. 10 is a diagram of an example of a question metadata frame, FIG. 11 is a diagram of an example of question contents, FIG. 12 is a diagram of an example of response contents, and FIG. 13 is a diagram of an example of the reply contents generated in step S945 of FIG. 9.

FIG. 14 is a diagram of an example of metadata extraction of an election voting service according to an ontology classification method, FIG. 15 is a diagram of a metadata description frame according to RDF, FIG. 16 is a diagram of a metadata description frame according to XML, FIG. 17 is a diagram of a metadata description frame according to a relational data model, FIG. 18 is a diagram of an example of metadata extraction of the opinion poll service according to the ontology classification method, FIG. 19 is a diagram of a metadata description frame according to the RDF, FIG. 20 is a diagram of a metadata description frame according to the XML, FIG. 21 is a diagram of a metadata description frame according to the relational data model, and FIG. 22 is a diagram of an example for reversely converting the reply contents of a table type to the metadata description frame.

FIG. 27 is an example of an SQL program for generating a metadata frame in the table format of FIG. 21 as a database.

FIG. 28 is an example of an SQL program for constructing a designed metadata frame as a database.

BEST MODE FOR CARRYING OUT THE INVENTION

Figure 1:
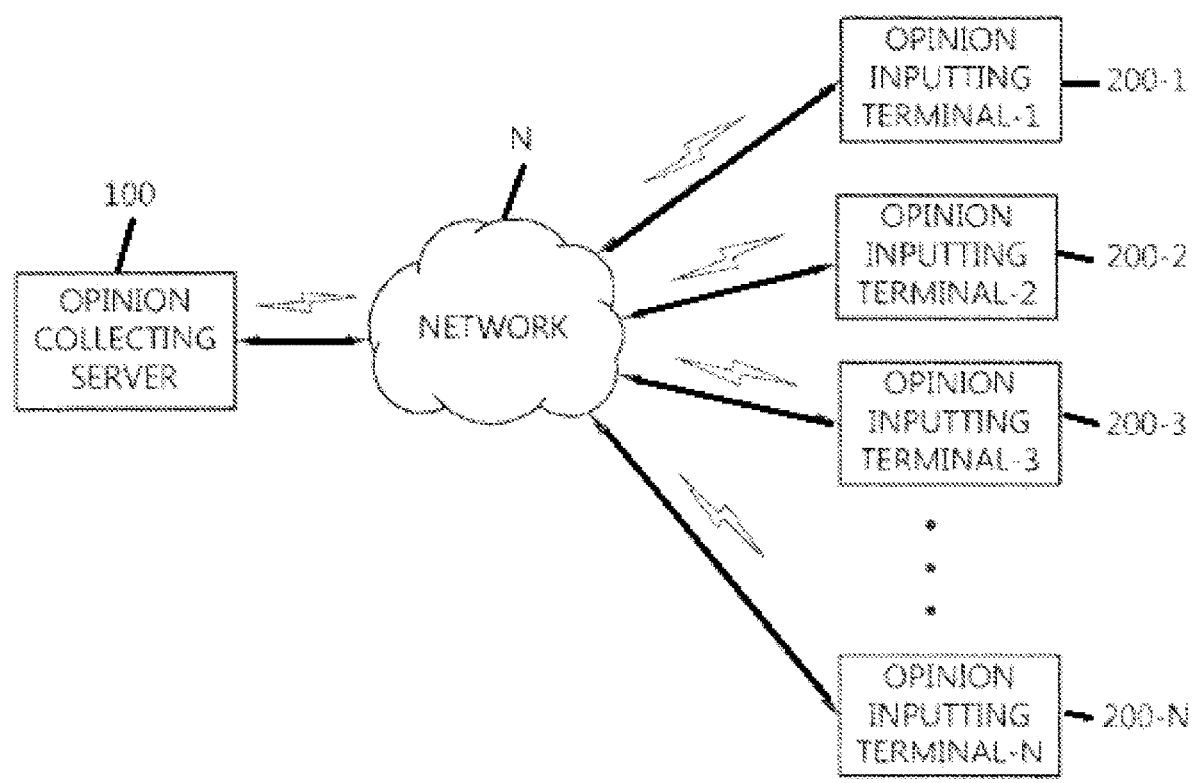

Hereinafter, the present invention is explained in detail by referring to the drawings.

FIG. 1 is a diagram of a system for automatically collecting opinions according to an embodiment of the present invention. The system for automatically collecting opinions is a system capable of automatically collecting opinions of multiple people and compiling statistics with the collected opinions.

Figure 23:
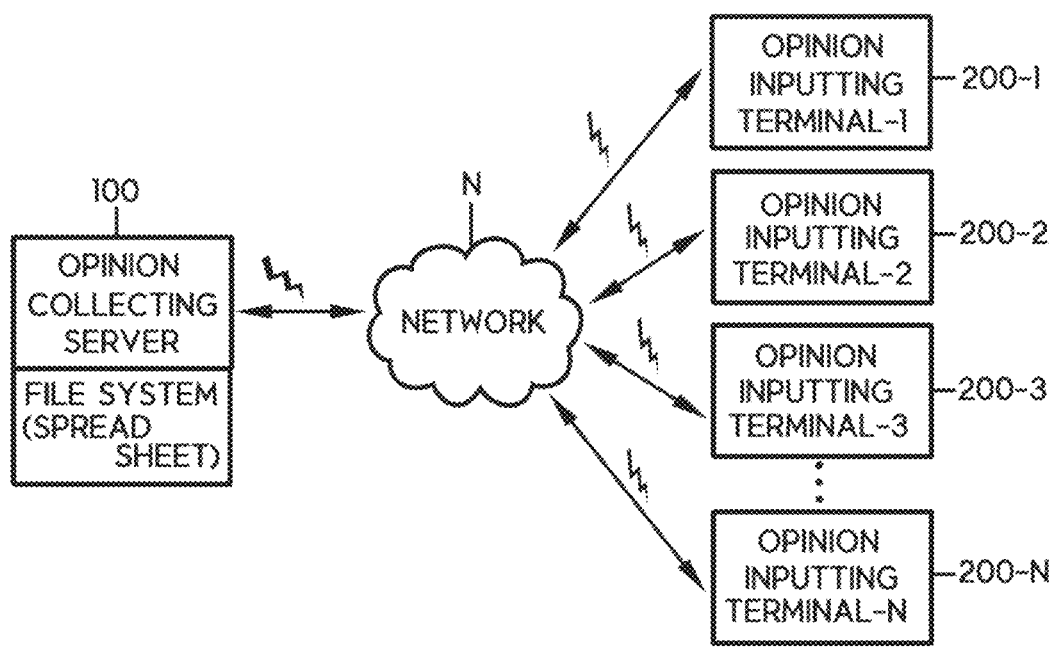
FIG. 23 is a diagram of a system for automatically collecting opinions based on a spread sheet as its file system.
Figure 24:
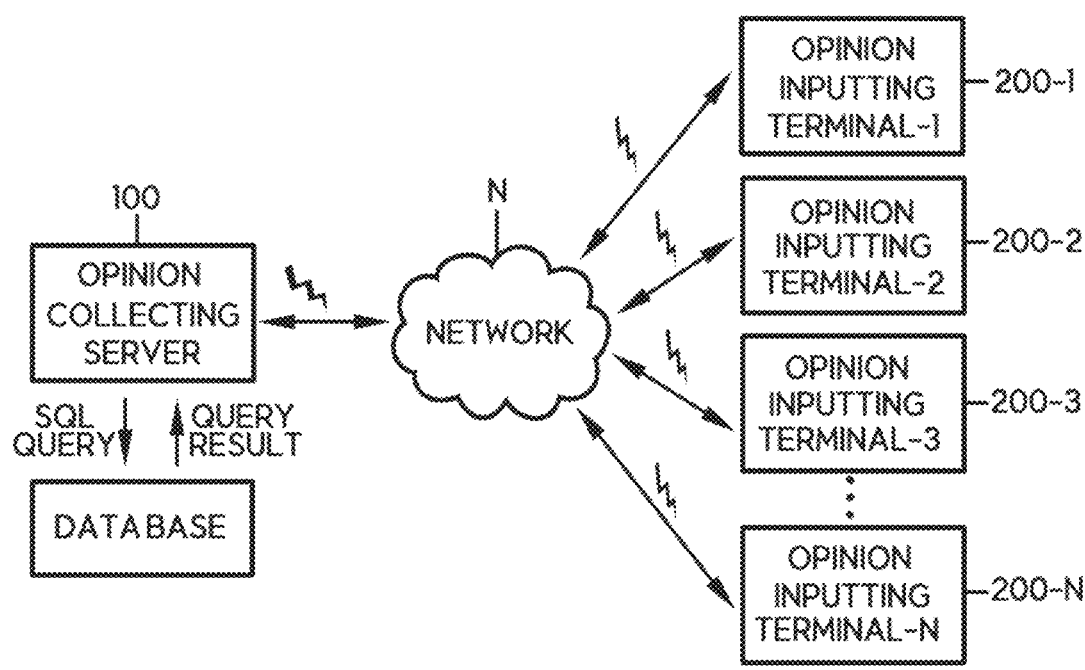
FIG. 24 is another diagram of a system for automatically collecting opinions according to a preferred embodiment of the present invention.

FIG. 24 is another diagram of a system for automatically collecting opinions according to a preferred embodiment of the present invention. It is noted that instead of using a file system as shown in FIG. 23, FIG. 24 shows that the system uses a database system for storing and collecting user opinions. Here, the database is provided independently from the opinion collecting server 100.

A representative example of the opinion can include 1) a voting which is the opinion for selecting a particular candidate in an election, 2) opinions of people for a particular agenda, and the like.

Hence, the system for automatically collecting opinions according to embodiments of the present invention can provide 1) a solution for providing an election result by collecting/counting voting results of voters and 2) a solution for researching and collecting opinions of people and then providing statistically processed results.

As shown in FIG. 1, the system for automatically collecting opinions according to an embodiment of the present invention includes an opinion collecting server 100 and opinion inputting terminals 200-1 through 200-N.

The opinion collecting server 100 is connected with the opinion inputting terminals 200-1 through 200-N to communicate over a network (N). A type of the network N for interconnecting the opinion collecting server 100 and the opinion inputting terminals 200-1 through 200-N are not limited, and can be implemented using an adequate network if necessary.

For example, when the system for automatically collecting opinions according to an embodiment of the present invention is utilized as a system for collecting opinions of employees in a company, the network N can use a LAN.

However, when the system for automatically collecting opinions according to an embodiment of the present invention is utilized as a system for collecting voting results in a nationwide election, the network N needs to use a WAN, a mobile communication network, a PSTN, or a combination of some of them.

Also, how the opinion collecting server 100 and the opinion inputting terminals 200-1 through 200-N are connected to the network N is not limited. They can be connected to the network N by wire or by wireless, and a communication protocol is not limited either.

In the system for automatically collecting opinions according to an embodiment, the opinion collecting server 100 inquires of the opinion inputting terminals 200-1 through 200-N about the opinion of a user.

When the opinion inputting terminals 200-1 through 200-N send opinions of users to the opinion collecting server 100 in reply to the inquiry, the opinion collecting server 100 compiles statistics with the received opinions of the users and provides the result.

Figure 2:
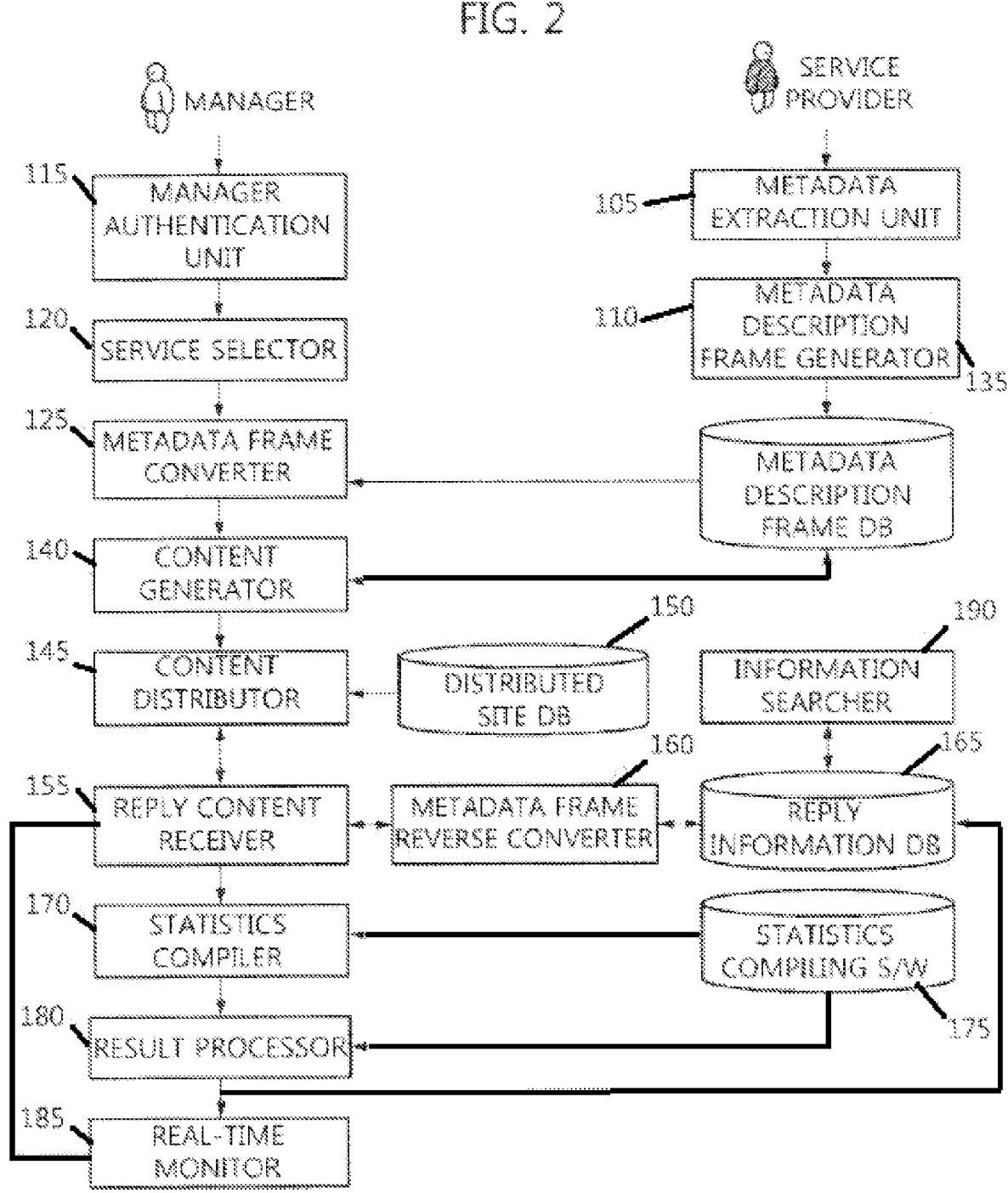

Hereafter, the opinion collecting server 100 and the opinion inputting terminals 200-1 through 200-N of FIG. 1 are described in further detail, and the opinion collecting server 100 is explained first by referring to FIG. 2.

The service content or opinion inputting terminal 200 in the exemplary embodiments can be implemented using the PC and portable communication equipment such as mobile phone, PDA, smartphone, table, and etc.

The technical feature of the present invention is to provide a user-customized survey or election service in a mobile cloud environment as shown in FIG. 1.

As shown in FIG. 1, the present invention is to provide the user-customized survey or election service based on the Internet, and the service system is composed of a service server and the information devices of user clients.

The cloud service of the user-customized survey or election service of the present invention is managed by the management system of the metadata description frame database of the service server for the user-customized survey or election service contents.

The mobile computing of the user-customized survey or election service of the present invention is to create the user-customized survey or election service contents using the editor's metadata frame that the service server provides to the information devices including the user's smartphone.

In addition, the user information device, which is for a client using the user-customized survey or election service, includes a portable device, and the service server and the client device are connected through a wired or wireless network.

The features of the user-customized survey or election service system of the present invention are consistent with those of mobile cloud, mobile cloud computing, and mobile cloud application.

Consequently, the user-customized survey or election service of the present invention is a mobile computing application service based on mobile cloud and mobile cloud computing.

Of course, the user-customized survey or election service of the present invention can be provided as a mobile web/app or a native app service to the user's information devices including smartphones.

Mode of the Invention

FIG. 2 is a detailed block diagram of the opinion collecting server 100 of FIG. 1. Blocks constituting the opinion collecting server 100 as shown can be implemented using S/W and H/W. Also, some of the blocks constituting the opinion collecting server 100 can be implemented using S/W and the remaining blocks can be implemented using H/W.

The opinion collecting server 100, as shown in FIG. 2, includes a metadata extraction unit 105 and a metadata description frame generator 110 on the side of a system service provider, a manager authentication unit 115, a service selector 120, a metadata frame converter 125, a metadata description frame DB 135, a content generator 140, a content distributor 145, a distributed site DB 150, a reply content receiver 155, a metadata frame reverse converter 160, a reply information DB 165, a statistics compiler 170, a statistics compiling S/W 175, a result processor 180, a real-time monitor 185, and an information searcher 190 on the side of a manager.

The metadata extraction unit 105 and the metadata description frame generator 110 are a preprocessor to be installed prior to a self system service which furnishes the opinion collecting system service. Originally, metadata indicates data relating to the information. In embodiments of the present invention, the metadata indicates data to be contained in contents necessary for the opinion collecting service, and metadata items indicate metadata property, category, type, and value.

For example, questions and answers of the survey service contents are metadata.

The 'question' metadata should be suppressed, for example, within 30 characters of the alphabet. The format of the response is a multiple-choice, short answer, and etc., and the response are metadata items.

In the present invention, the relationship between the metadata and metadata items is defined as a metadata frame. The metadata frame is a data model for constructing a database to create and to store contents of the user-customized survey or election service.

The metadata extraction unit 105 extracts, classifies, and organizes the metadata items required for the automatic opinion collecting service provided by the system for automatically collecting opinions as mentioned above. The metadata items are extracted, classified, and arranged with a methodology using ontology, which shall be explained later.

Figure 14:
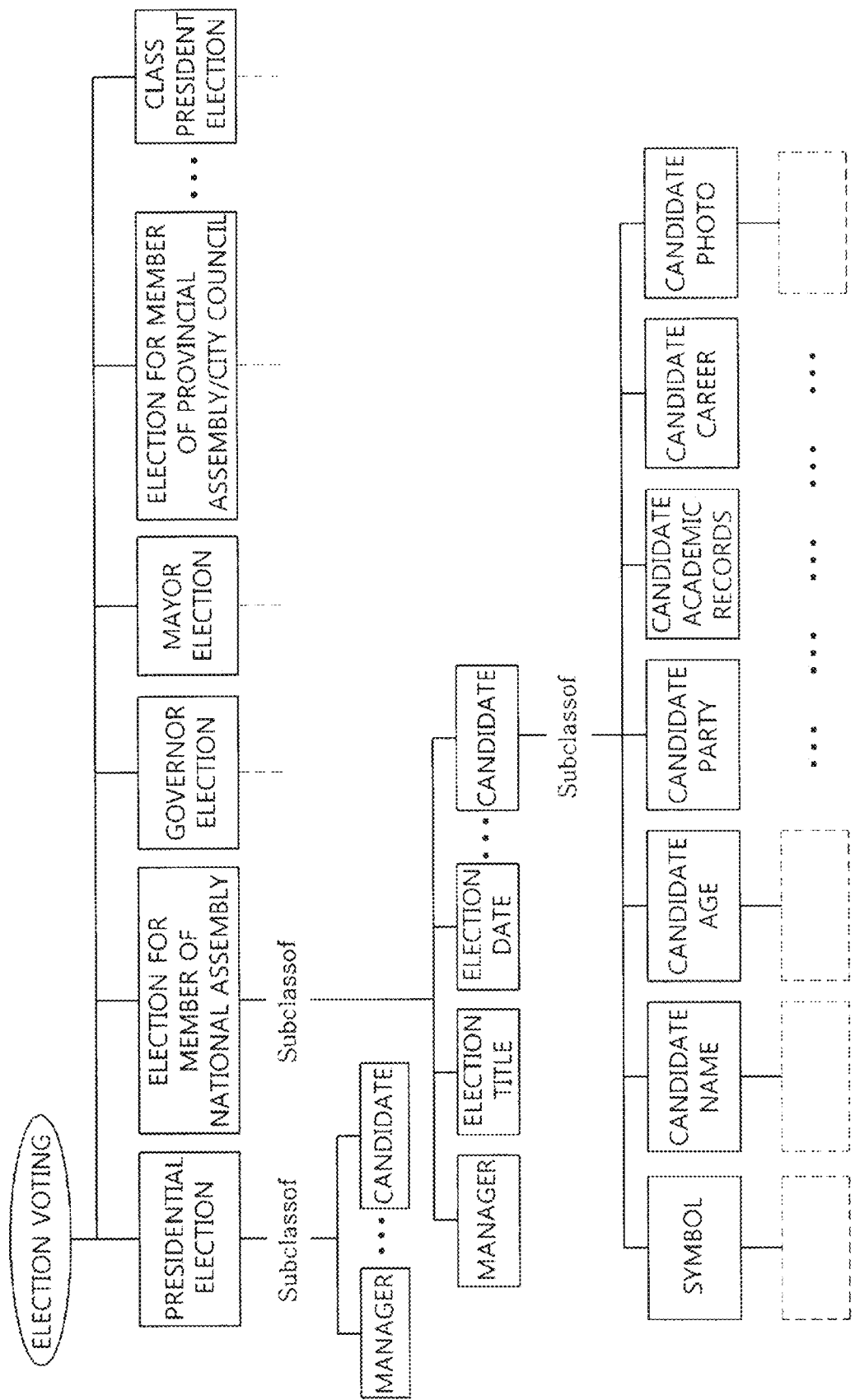
Figure 18:
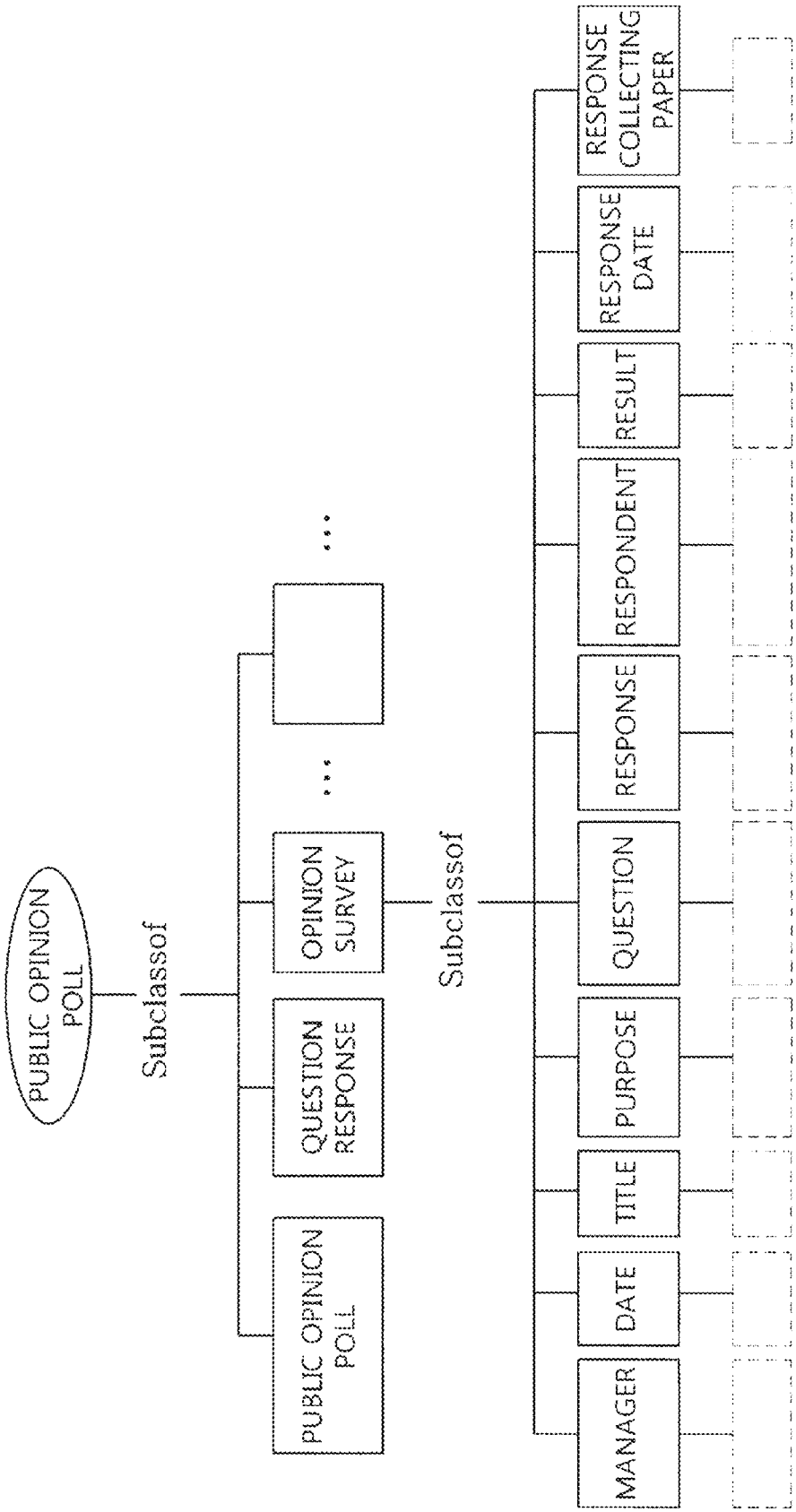

The ontology in the present invention is a system classifying the metadata items required for the service into hierarchical relationships and premise part relations, and is defined as word representation, which becomes the metadata items of the service (see FIG. 14 and FIG. 18).

The metadata description frame generator 110 generates the metadata items and the meta data frame relating to the opinion collecting service extracted by the metadata extraction unit 105 using the ontology scheme, as a metadata description frame.

At this time, a metadata description frame scheme can employ at least one of 1) a description method according to Resource Description Framework (RDF), 2) a description method according to eXtensible Hyper Text Markup Language (XHTML) or eXtensible Markup Language (XML), 3) a description method according to a data model of the database, and 4) a description method according to spread sheet.

A metadata description frame structure is necessary to enhance efficiency of the automatic opinion collecting system according to an embodiment of the present invention, and directly involves enhancement of a user interface and easiness of information search.

The metadata description method according to the RDF representation describes the frame of the metadata in a graphical structure by combining basic description units of the metadata into three elements of resource, property, and value.

The metadata description method according to the XHTM or XML representation describes the metadata frame in a tree structure with structural element type, class property, and IDentification (ID) property of the metadata.

Meanwhile, the metadata description method according to the data model representation of the database can describe the metadata frame with the data model scheme of the database, that is, with a hierarchical data model, a network data model, a relational data model, an object-oriented data model, and NoSQL database data model.

A data processing system of the spread sheet type such as excel of Microsoft may be used. The data processing system of the spreadsheet type refers to a system using the data entry form and statistical functions of spreadsheet.

Advantages of the metadata frame description methods according to the RDF, XHTML, and XML representations include high compatibility and high congeniality with semantic web technology which is studied as a next-generation web technology. Meanwhile, the metadata frame description methods according to the database data model and the spread sheet can be mounted using existing stabilized theory techniques and tools.

The metadata description frame generator 110 generates the metadata description frame DB 135. For storing a metadata frame with the metadata and metadata items defined by a definite unit of the metadata in the above-described manner into the metadata description frame, the metadata description frame databases of metadata RDF frame, metadata XML frame, metadata XHTML frame, metadata RDB frame, and metadata spreadsheet frame method is constructed according to the metadata description frame method.

The metadata description frame generator 110 generates a metadata description frame with the metadata defined by a definition unit of the metadata in the above-described manner, and stores it to the metadata description frame DB 135. The voting service and the opinion collecting service in the automatic opinion collecting system as above shall be explained in detail by referring to FIGS. 14 through 21.

The manager authentication unit 115 authenticates whether a rightful manager accesses the opinion collecting server 100. Herein, the rightful manager indicates a manager who manages and takes charge of the opinion collection via the opinion collecting server 100 or a manager of the corresponding authority in an institution which manages and takes charge of the opinion collection via the opinion collecting server 100.

When the opinion collecting server 100 is a server for collecting voting results, the rightful manager indicates the person in charge of the election administration, or the person belonging to the institution in charge of the election administration and given the authority.

When the opinion collecting server 100 is a server for collecting opinions, the rightful manager indicates the person authorized to survey opinions, or the person in charge of the corresponding task in an institution authorized to survey opinions.

Herein, the authentication procedure can be performed in various manners. For example, the authentication procedure can be carried out by 1) checking ID/PW, 2) authenticating through a certificate or a digital signature, 3) verifying using an authentication card, USB memory, and the like, and 4) identifying using biometric information (for example, face photo, voice, fingerprint, iris, etc.).

At this time, a) the face photo can be obtained through a PC camera (not shown) of the opinion collecting server 100, b) the voice can be obtained through a microphone (not shown) of the opinion collecting server 100, c) the fingerprint can be obtained through a fingerprint reader (not shown) connected to the opinion colic server 100, and d) the iris can be obtained through an iris scanner (not shown) connected to the opinion collecting server 100.

The service selector 120 provides a manager interface for selecting any one of opinion collecting services supplied by the opinion collecting server 100. This is useful when the opinion collecting server 100 provides several opinion collecting services.

As stated above, the opinion collecting services provided by the opinion collecting server 100 can be classified into a voting result collecting service (electronic voting service) and an opinion collecting service (electronic survey service). Accordingly, the service selector 120 provides the manager interface for selecting any one of the electronic voting service and the electronic survey service.

The manager can select an intended service through the manager interface. At this time, it is understood that the manager is who verified as the rightful manger by the manager authentication unit 115.

The metadata description frame DB 135 stores metadata description frames. Meanwhile, contents required for the opinion collecting service are 1) opinion determining contents and 2) opinion inputting contents.

Herein, 1) the opinion determining contents are contents containing information to be referred to before the users make a decision, and 2) the opinion inputting contents are contents used for the users to input the determined opinion after making the decision.

The metadata frame converter 125 generates an editor's metadata frame by converting the metadata description frame defined and described in the RDF, XHTML, database, data model, or spread sheet representation in the metadata description frame DB 135, to a table type which is the user interface form so that the manager or the user can easily obtain and use. The metadata frame converter 125 stores (databases) the generated metadata frame to the metadata description frame DB 135.

For doing so, the metadata frame converter 125 extracts necessary metadata description frames from the metadata description frames stored to the metadata description frame DB 135.

Herein, the necessary metadata description frames are 1) metadata description frames for the metadata or metadata items to be contained in the editor's metadata frame the opinion determining contents and 2) metadata description frames for the metadata or metadata items to be contained in the editor's metadata frame the opinion inputting contents, for the opinion collecting service selected by the service selector 120.

The extracted metadata description frame corresponds to metadata or metadata items described in the editor's metadata frame.

Thus, when extracting the metadata description frame, the metadata frame converter 125 refers to which opinion collecting service is selected by the user through the service selector 120. For example, when the user selects the electronic voting service through the service selector 120, the metadata frame converter 125 extracts the metadata description frames required for the electronic voting service. By contrast, when the user selects the electronic survey service through the service selector 120, the metadata frame converter 125 extracts the metadata description frames required for the electronic survey service.

The metadata frame converter 125 generates the editor's metadata frame of the table type by converting the extracted metadata description frame. More specifically, the metadata frame converter 125 generates the editor's metadata frame of the table type including the metadata or metadata items corresponding to the extracted metadata description frame.

As a result, the metadata frame converter 125 generates 1) the opining determining editor's metadata frame including the metadata or metadata items for the opinion determining contents and 2) the opinion inputting editor's metadata frame including the metadata or metadata items for the opinion inputting contents.

The content generator 140 includes actual metadata corresponding to the metadata items contained in the metadata frame generated by the metadata frame converter 125. That is, the contents can indicate the editor's metadata frame including the actual metadata.

The user contents inputted in the user's actual metadata corresponding to the metadata items of the editor's metadata frame is the same as the content in which the user's actual metadata is stored in the metadata description frame database.

That is, the user contents generated by the user inputting into the editor's metadata frame are stored and managed in the metadata description frame database.

Every user enters the user's actual metadata in the editor's metadata frame provided to the user's information devices including smartphones and stores it in the metadata description frame database as shown in FIG. 2 (140->135).

The contents generated by the content generator 140 are the opinion determining contents and the opinion inputting contents.

The content distributor 145 distributes the opinion determining contents and the opinion inputting contents generated by the content generator 140, only to the corresponding persons of the user terminals 200-1 through 200-N.

To distribute only to the corresponding persons of the user terminals 200-1 through 200-N, the content distributor 145 refers to the distributed site DB 150. This is because the distributed site DB 150 includes addresses of users for the opining collection.

Herein, the address of the user indicates a mobile phone number, an IP address, and an E-mail address of the user. The mobile phone number is appropriate when the user terminal is a mobile phone, the IP address is appropriate when the user terminal is a PC and the E-mail address is appropriate when the user terminal is either.

The user terminal receiving the distributed contents from the content distributor 145 transmits reply contents in response, which is to be explained. The reply contents include the opinion of the user of the user terminal.

Then, the reply content receiver 155 of the opinion collecting server 100 of FIG. 2 receives the reply contents transmitted by the user terminal.

The metadata frame reverse converter 160 reversely converts the reply metadata frame of the table type contained in the reply contents received by the reply content receiver 155, to the metadata description frame of the RDF, XHTML, database model, or spread sheet form, and thus generates the metadata description frame. The metadata frame reverse converter 160 stores (databases) the metadata description frame to the reply information DB 165 and also sends it to the real-time monitor 185.

Meanwhile, the statistics compiler 170 extracts the user's opinion contained in the reply contents received by the reply content receiver 155, compiles the statistics by analyzing the extracted opinion, and then stores the result to the reply information DB 165. At this time, the statistics compiler 170 uses the statistics compiling S/W.

The result processor 180 generates the statistics compiling result of the statistics compiler 170 as visual information.

The real-time monitor 185 processes the reception count state of the reply content receiver 155 as visual information and provides the visual information to the manager in real time. Also, the real-time monitor 185 provides the visual information of the statistics compiling result generated by the result processor 180 to the manager.

Also, the real-time monitor 185 can send a reply request message to user terminals which do not send the reply contents. In so doing, the message can include a total reply rate and a period for reply.

Meanwhile, the transmission/contents of the message can vary according to whether the distributed contents are received. For example, it is possible to send the reply request message only to the user terminal which receives and confirms the contents but does not send the reply contents, and not to send the reply request message to the user terminal which does not receive the contents. This is because the probability of the reply is high when the reply is demanded in the former case.

The information searcher 190 functions to search the metadata item and the metadata which are the information contained in the metadata frame, for example, to search "candidate" corresponding to "candidate", "affiliated party", and "OO party", or search a search term meeting a certain condition such as "candidate" won "OO election".

So far, the opinion collecting server 100 of FIG. 2 has been described in detail. Hereafter, the opinion inputting terminals 200-1 through 200-N of FIG. 1 are elucidated by referring to FIG.

Figure 3:
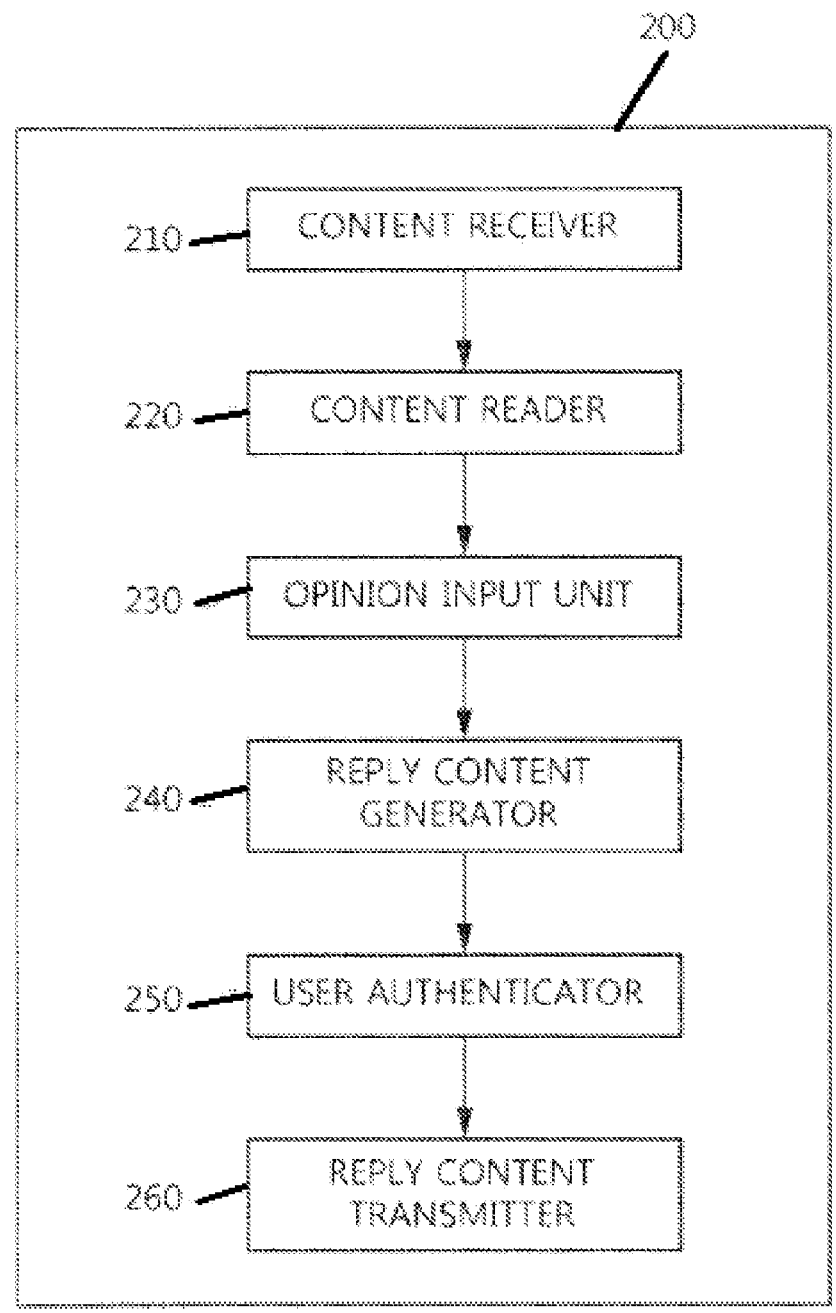

Since the opinion inputting terminals 200-1 through 200-N can be implemented in the same structure, the single opinion inputting terminal is solely illustrated in FIG. 3 and represented by a reference numeral 200.

Figure 25:
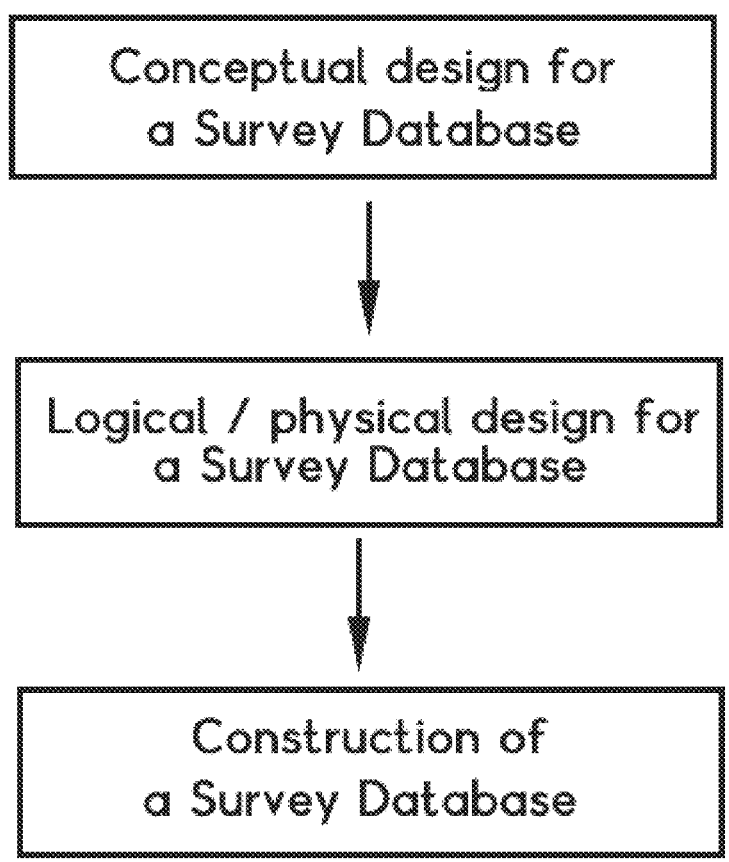
FIG. 25 is a diagram of three different phases of a database data model according to an embodiment of the present invention.

FIG. 25 shows three different phases of a database data model of the present invention. The first phase is to design a concept of a particular survey database. The first phase includes steps of extracting, classifying, and organizing conceptual design data required for collecting the opinions of the users into vocabulary data as metadata items. The second phase is to design the survey database logically and physically. The second phase includes steps of generating metadata description frames by using the metadata items indicating properties of data relating to the opinion collecting service and constructing a database of the metadata description frames. Finally, the third phase is to construct the survey database. The third phase includes steps of databasing the generated metadata description frame.

FIG. 3 is a detailed block diagram of the opinion inputting terminal 200. Blocks constituting the opinion inputting terminal 200 as shown can be implemented using S/W and H/W. Also, some of the blocks constituting the opinion inputting terminal 200 can be implemented using S/W and the remaining blocks can be implemented using H/W.

The opinion inputting terminal 200, as shown in FIG. 3, includes a content receiver 210, a content reader 220, an opinion input unit 230, a reply content generator 240, a user authenticator 250, and a reply content transmitter 260.

The content receiver 210 receives the contents distributed by the content distributor 145 of the aforementioned opinion collecting server 100. Since the contents distributed by the content distributor 145 are the opinion determining contents and the opinion inputting contents, the contents received by the content receiver 210 are also the opinion determining contents and the opinion inputting contents.

The content reader 220 processes to display the opinion determining contents received by the content receive 210 in a display so that the user can read them.

The opinion input unit 230 processes to convert the opinion inputting contents received by the content receiver 210 to a user interface through which the user can input his/her opinion as reading and to show it in the display.

Hence, the user can input his/her opinion using the opinion inputting contents. The opinion input unit 230 forwards the user's opinion input through the opinion inputting contents to the reply content generator 240.

The reply content generator 240 generates the opinion inputting contents including the user's opinion received via the opinion input unit 230, as the reply contents.

The user authenticator 250 authenticates whether the user who inputs the opinion is the rightful user. Herein, the rightful user indicates the person who has the right or the authority to input the opinion through the opinion inputting terminal 200.

When the opinion collecting service is the electronic voting service, the rightful user is the voter who has the right to vote. When the opinion collecting service is the electronic survey service, the rightful user indicates the person belonging to the sample to survey or the person having the voting right.

At this time, the authentication procedure can be performed using various methods as in the manager authentication unit 115 of the opinion collecting server 100 as stated above.

Accordingly, the authentication procedure can be carried out by 1) checking JD/PW, 2) authenticating with a certificate or a digital signature, 3) verifying using an authentication card, USB memory, and the like, and 4) identifying using biometric information (for example, face photo, voice, fingerprint, iris, etc.

At this time, a) the face photo can be obtained through a PC camera (not shown) of the opinion inputting terminal 200, b) the voice can be obtained through a microphone (not shown) of the opinion inputting terminal 200, c) the fingerprint can be obtained through a fingerprint reader (not shown) connected to the opinion inputting terminal 200, and d) the iris can be obtained through an iris scanner (not shown) connected to the opinion inputting terminal 200.

When the user authenticator 250 verifies the rightful user, the reply content transmitter 260 sends the reply contents generated by the reply content generator 240 to the reply content receiver 155 of the aforementioned opinion collecting server 100.

Figure 4:
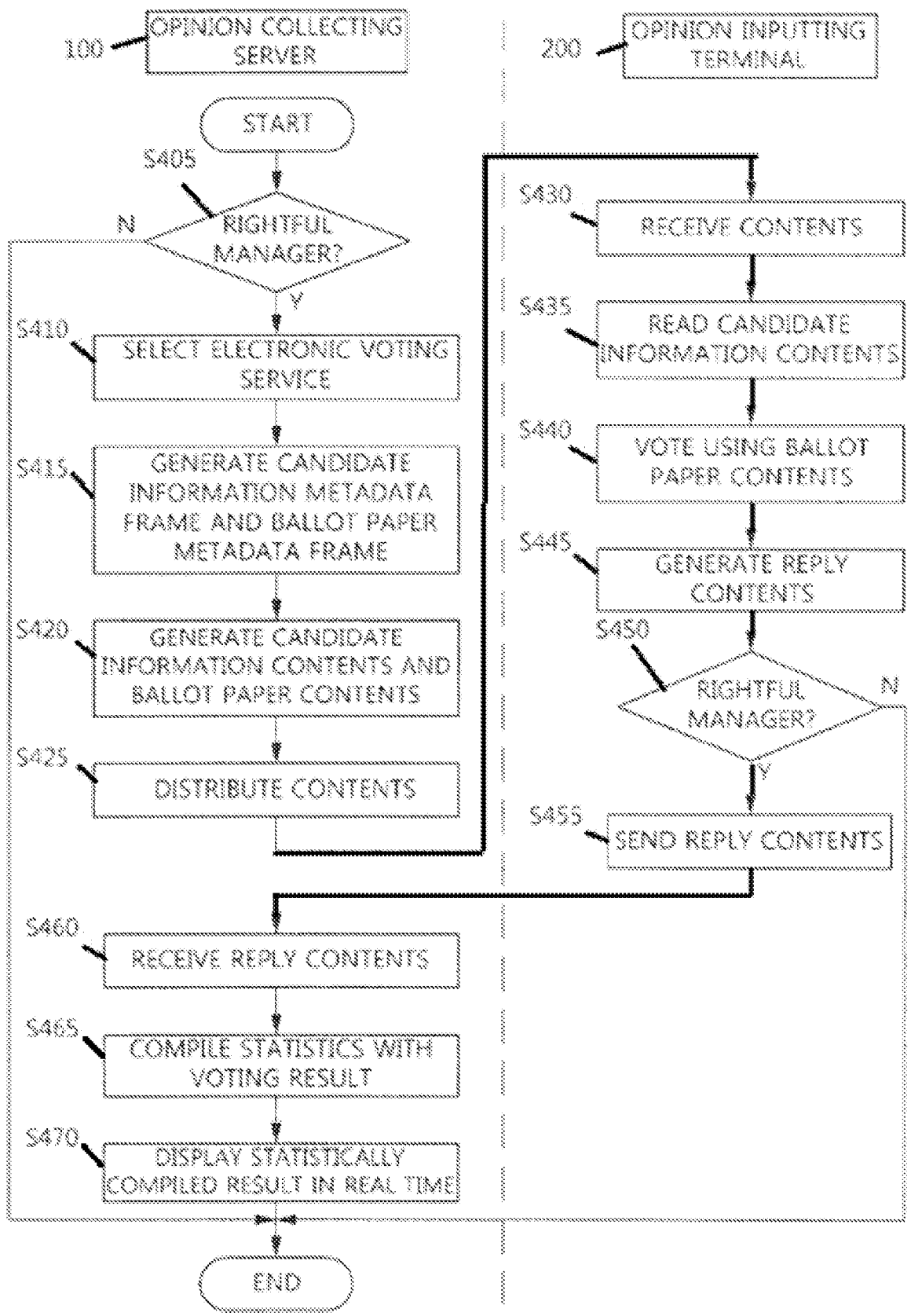

Hereafter, a process for collecting the voting result by conducting the electronic voting through the automatic opinion collecting system of FIG. 1 is explained in detail by referring to FIG. 4.

FIG. 4 is a flowchart of a method for collecting the electronic voting result and providing the election result according to another embodiment of the present invention.

In the flowchart of FIG. 4, the steps shown in the left side are performed by the opinion collecting server 100, and the steps shown in the right side are performed by the opinion inputting terminal 200.

As shown in FIG. 4, the manager authentication unit 115 of the opinion collecting server 100 authenticates whether the person accessing the opinion collecting server 100 is the rightful manager (S405).

When the rightful manager is authenticated in the step S405 and the manager selects the electronic voting service through the manager interface provided by the service selector 120 (S410), the metadata frame converter 125 generates the candidate information editor's metadata frame and the ballot paper editor's metadata frame (S415).

Herein, a preferable candidate information editor's metadata frame is the editor's metadata frame of the table type including the metadata items relating to the candidate information contents, and an example of the candidate information editor's metadata frame is shown in FIG. 5.

As shown in FIG. 5, the candidate information metadata frame includes, as the candidate information metadata items, "vote title", "manager", "election date", "symbol", "name of candidate", "age of candidate", "party of candidate", "academic records of candidate", "career of candidate", and "photo of candidate".

These metadata items correspond to properties of the information to be referred to by the user to determine the candidate. That is, the metadata items correspond to the properties of the necessary information for the opinion decision of the user who casts a vote, as explained earlier.

Meanwhile, the ballot paper editor's metadata frame is the editor's metadata frame including the metadata items required for the user to cast a vote.

Referring back to FIG. 4, after step S415, the content generator 140 generates the candidate information contents and the ballot paper contents by including the actual metadata corresponding to the metadata items contained in the editor's metadata frame generated in step S415 (S420).

Figure 6:
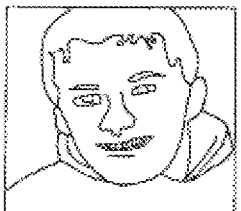

FIG. 6 depicts an example of the candidate information contents. The candidate information contents of FIG. 6 are generated by including information of the actual election and information of the actual candidate to the candidate information metadata frame of the table type of FIG. 6.

More specifically, the candidate information contents of FIG. 6 include 1) "8th parliamentary election" as the actual metadata for the metadata item "vote title", 2) "parliamentary election management committee" as the actual metadata for the metadata item "manager", 3) "Apr. 7, 2012" as the actual metadata for the metadata item "election date", 4) "No. 1" as the actual metadata for the metadata item "symbol", 5) "Lee Mong Yong" as the actual metadata for the metadata item "name of candidate", 6) "42" as the actual metadata for the metadata item "age of candidate", 7) "XX party" as the actual metadata for the metadata item "party of candidate", 8) "graduated from Good Elementary School in 1985/graduated from Outstanding University with economics major in 1995/obtained master degree in Harvard University in U.S.A. in 2000" as the actual metadata for the metadata item "academic records of candidate", 9) "XX Electronics researcher/XX governor/Oth member of the National Assembly" as the actual metadata for the metadata item "career of candidate", and 10) a photo of the candidate as the actual metadata for the metadata item "photo of candidate".

Meanwhile, FIG. 7 depicts an example of the ballot paper contents. As shower FIG. 7, the ballot paper contents include the metadata items required for the voting and the actual metadata of the metadata items, and accordingly, it is noted that the ballot paper contents can function as the ballot paper.

The metadata items in the ballot paper contents of FIG. 7 are "vote title", "election date", "symbol", "name", and "vote column". In the ballot paper contents, 1) the actual metadata for the metadata item "vote title" is "8th parliamentary election", 2) the actual metadata for the metadata item "election date" is "Apr. 7, 20 12", 3) the actual metadata for the metadata item "symbol" is "1", "2", "3", "4", "5", "6", and "7", and 4) the actual metadata for the metadata item "name of candidate" is "Lee Mong Yong", "Kim Cheal Soo", "Lee Young Hee", "Park Young Seok", "Choi Jin Soo", "Jung Sung Hoon", and "Ha Dong Soo".

Meanwhile, the actual metadata for "vote column" is not recorded, which is recorded in step S445 according to the voting of the user input in step S440 to be explained.

Referring back to FIG. 4, after step S420, the content distributor 145 distributes the candidate information contents and the ballot paper contents generated in step S420 to the user terminal 200 (S425), As distributing in step S425, the content distributor 145 refers to the distributed site DB 150.

Then, the content receiver 210 of the opinion inputting terminal 200 receives the candidate information contents and the ballot paper contents distributed in step S425 (S430).

The content reader 220 shows the candidate information contents received in step S430 in the display so that the user can read them (S435).

The opinion input unit 230 processes to convert the ballot paper contents received in step S430 to the user interface through which the user can read to cast a vote, and to display in the display (S440).

Hence, the user can cast a vote for his/her intended candidate using the ballot paper contents.

Then, the reply content generator 240 generates the reply contents with the ballot paper contents including the candidate selected by the user in step S440 (S445).

An example of the reply contents generated in step S445 is shown in FIG. 8. The reply contents of FIG. 8 are the ballot paper contents including "candidate No. 1 Lee Mong Yang".

Referring back to FIG. 4, after step S445, the user authenticator 250 authenticates whether the user voted in S440 is the rightful user (S450).

When the rightful user is confirmed in step S450 (S450-Y), the reply content transmitter 260 transmits the reply contents generated in step S445 to the reply content receiver 155 of the opinion collecting server 100 (S455).

Then, the reply content receiver 155 of the opinion collecting server 100 receives the reply contents transmitted in step S455 (S460).

The reply contents received in step S460 are stored to the reply information DB 165.

Meanwhile, it is possible to send the reply contents received in step S460 to the real-time monitor 185 as well so that the real-time monitor 185 outputs the vote count state in real time.

The statistics compiler 170 extracts the user's voting result in the reply contents received in step S460, and compiles the statistics with the extracted voting result (S465).

Then, the result processor 180 generates the statistically compiled result of step S465 as the visual information, and the real-time monitor 185 displays the generated visual information in the display in real time and provides it to the manager in real time (S470).

Figure 9:
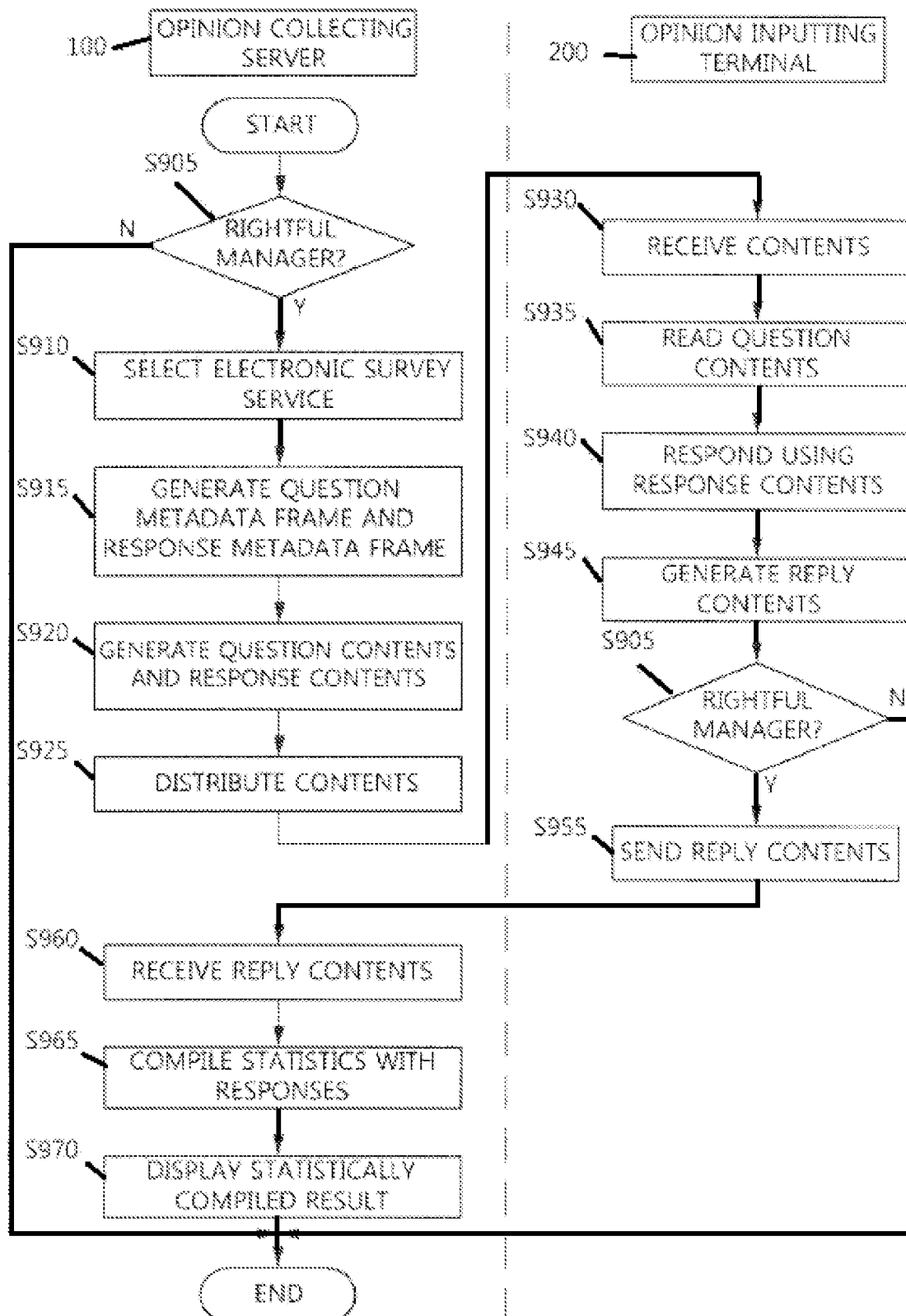

Hereafter, a process for collecting opinions through the electronic survey using the automatic opinion collecting system of FIG. 1 is explained in detail by referring to FIG. 9.

FIG. 9 is a flowchart of a method for collecting opinions using the electronic survey and providing the collection result according to another embodiment of the present invention.

In the flowchart of FIG. 9, the steps shown in the left side are performed by the opinion collecting server 100, and the steps shown in the right side are performed by the opinion inputting terminal 200.

As shown in FIG. 9, the manager authentication unit 115 of the opinion collecting server 100 authenticates whether the person accessing the opinion collecting server 100 is the rightful manager (S905).

When the rightful manager is confirmed in step S905 (S905-Y) and the manager selects the electronic survey service through the manager interface provided by the service selector 120 (S910), the metadata frame converter 125 generates the question editor's metadata frame and the response editor's metadata frame (S915). At this time, the question can include at least one of a multiple-choice question and a short-answer question.

Herein, the question editor's metadata frame is the editor's metadata frame including the metadata items for the question contents, and FIG. 10 shows an example of the question metadata frame.

As shown in FIG. 10, the question editor's metadata frame includes, as the question metadata items, "title", "manager" "question 1", "question 2", . . . , "respondent", and "date of response".

The metadata items correspond to the properties of the information to refer to when the user determines the opinion and other basic information.

Meanwhile, the response editor's metadata frame is the editor's metadata frame including the metadata items required for the user to input the response to the question.

Referring back to FIG. 9, after step S915, the content generator 140 generates the question contents and the response contents by including actual metadata corresponding to the metadata items contained in the metadata frame generated in step S915 (S920).

FIG. 11 depicts an example of the question contents. The question contents in FIG. 11 are generated by including actual basic information and actual questions to the question metadata frame of FIG. 10.

Specifically, the question contents of FIG. 11 include 1) "MT opinion survey" as the actual metadata for the metadata item "title", 2) "student council "as the actual metadata for the metadata item "manager", 3) "new term MT place . . . Mt. Mai" as the actual metadata for the metadata item "question 1", 4) "MT date . . . April 15" as the actual metadata for the metadata item "question2", 5) "Lee Mong Yong" as the actual metadata for the metadata item "respondent", and 6) "20 12.0.0" as the actual metadata for the metadata item "date of response".

Meanwhile, FIG. 12 depicts an example of the response contents. As shown in FIG. 12, the response contents include metadata items required for inputting responses for the questions and actual metadata of the metadata items. Hence, the response contents can function as a response collecting paper.

The metadata items in the response contents of FIG. 12 are "title", "date", "question 1", "question2", . . . In the response contents, 1) the actual metadata for the metadata item "title" is "MT opinion survey", and 2) the actual metadata for the metadata item "date" is "2012.O.O".

Meanwhile, while the actual metadata for the metadata items "question 1" and "question2" are not included, they are included in step S945 according in step S945 to the response of the user input in step S940 to be explained.

Referring back to FIG. 9, after step S920, the content distributor 145 distributes the question contents and the response contents generated in step S920 to the user terminal 200 (S925). In the distribution of step S925, the content distributor 145 refers to the distributed site DB 150.

Then, the content receiver 210 of the opinion inputting terminal 200 receives the question contents and the response contents distributed in step S925.

The content reader 220 shows the question contents received m step S930 in the display so that the user can read them (S935).

The opinion inputting unit 230 converts the response contents received in step S930 to the user interface through which the user can input the response for the question while reading it, and processes to show it in the display (S940).

Hence, the user can input his/her intended response using the response contents.

Then, the reply content generator 240 generates the reply contents with the response contents including the response input by the user in step S940 (S945).

An example of the reply contents generated in step S945 is shown in FIG. 13. The reply contents of FIG. 13 are the response contents which input "Mt. Songni" in response to "new term MT place . . . " and "April 15" in response to "MT date . . . ".

Referring back to FIG. 9, after step S945, the user authenticator 250 authenticates whether the user responding in step S940 is the rightful user (S950).

When confirming the rightful user in step S950, the reply content transmitter 260 transmits the reply contents generated in step S945 to the reply content receiver 155 of the opinion collecting server 100 (S955).

The reply content receiver 155 of the opinion collecting server 100 receives the reply contents transmitted in step S955 (S960).

The reply contents received in step S960 are stored to the reply information DB 165.

Meanwhile, it is possible to send the reply contents received in step S960 also to the time monitor 185 so that the real-time monitor 185 outputs the response count state in real time.

The statistics compiler 170 extracts the user's response in the reply contents received in step S960, and compiles the statistics with the extracted response (S965).

The result processor 180 generates the visual information with the statistically compiled result of step S965, and the real-time monitor 185 shows the generated visual information in the display in real time to provide to the manager in real time (S970).

The exemplary embodiments explained so far can be applied to the public opinion poll.

The opinion inputting terminal 200 in the exemplary embodiments can be implemented using the PC and portable communication equipment such as mobile phone or PDA.

Meanwhile, the order of the manager authenticating step S405 and the user authenticating step S450 in FIG. 4 can be realized differently. For example, the manager authenticating step S405 can be performed any time before step S425, and the user authenticating step S450 can be performed before step S435 as well.

This also applies to the manager authenticating step S905 and the user authenticating step S950 in FIG. 9.

Hereafter, the necessary functions of the automatic opinion collecting system provider of the present invention before the service provision, that is, the functions of the metadata extraction unit 105 and the metadata description frame generator 110 of FIG. 2 are elucidated.

FIG. 14 depicts an example of the election voting ontology classification as the method for databasing the item relating to the electronic voting in the automatic opinion collecting system according to an embodiment of the present invention. Referring to FIG. 14, the properties of the resource 'election voting' include 'presidential election', 'election for member of the National Assembly', and so on, the resource 'election for member of the National Assembly' includes the properties 'manager', 'election title', 'election date', and so on, which contain (input) instance. "SubClassOF" in FIG. 14 is the expression indicating subsumption relation that the higher subsumes the lower.

Figure 15:
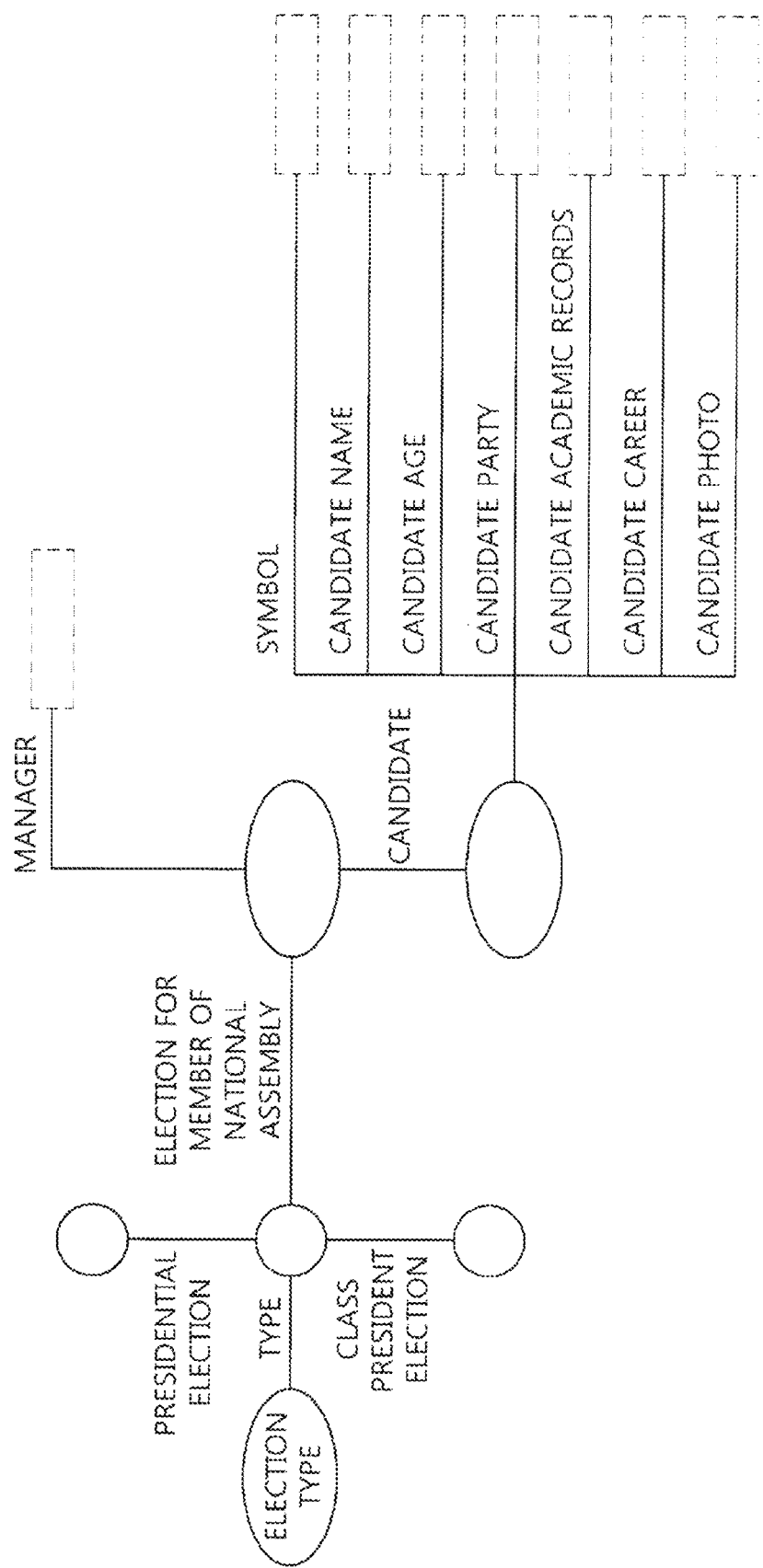

FIG. 15 depicts the relations between the elements of the 'election voting' related metadata of FIG. 14 described and expressed using the RDF. In FIG. 15, the graph is drawn with three elements of the resource, the property, and the value.

A database of metadata RDF frame method can be implemented by triplestore, RDF store, or graph database. A triplestore or RDI store is a purpose-built database for the storage and retrieval of triples through semantic queries. A triple is a data entity composed of subject-predicate-object. Much like a relational database, one stores information in a triplestore and retrieves it via a query language. Unlike a relational database, a triplestore is optimized for the storage and retrieval of triples. In addition to queries, triples can usually be imported/exported using Resource Description Framework (RDF) and other formats. A graph database has a more generalized structure than a triplestore, using graph structures with nodes, edges, and properties to represent and store data.

Therefore, the metadata frame for constructing the database of the user-customized survey or election service of the present invention method implemented by the metadata RDF frame method using the DB technique as described above can be implemented by the metadata RDF frame database.

FIG. 16 redescribes and reexpresses the metadata 'election voting' described and expressed using the RDF in FIG. 14, using the XML. FIG. 17 is a diagram of the metadata frame according to the relational data model of the database. The metadata frame according to the spread sheet type can be described similarly to the relation data model. The database by the method of the above XHTML or XML description parses and saves the XML file using DomPaser. The XML storage DB is implemented in RDB or NoSQL DB. The metadata frames described in XML as shown in FIG. 16 and FIG. 20 are parsed by the DomPaser, and the parsed results are stored in the metadata description frame database using the RDB or NoSQL DB.

The following is a description of implementation of metadata description frame database construction using the metadata spreadsheet frame method.

A spreadsheet consists of a table of cells arranged into rows and columns and referred to by the X and Y locations. A spreadsheet is essentially just one table.

The editor's metadata frame of the present invention for creating user customized surveys and election content is created using the data entry form of the spreadsheet or word/document processor.

However, the survey or election service based on the spreadsheet description frame cannot provide a metadata frame for a common editor to a plurality of users for a single service.

Because the survey and election service system based on the spreadsheet description frame is a single user service, it cannot provide a metadata frame and database for editors that can be shared by multiple users.

In addition, there is no function to store the generated user-customized content, and each service results in a common database. That is, the spreadsheet description frame method is generated as a single table file as shown in FIG. 23 and is only stored in the user's personal file system.

In the conventional technology, because there was no spreadsheet supporting mobile cloud computing, there was no user-customized survey or election service system using spreadsheets.

The service system requires a database, in which relevant data such as user surveys or election results and contents generated from each user's spreadsheet description frame are jointly stored and managed. As a concrete implementation method, there is a method of integrating a database into a spreadsheet description method.

In other words, the editor's metadata frame can be processed using a spreadsheet data entry method, and content data of each inputted user can be stored in a database. The metadata spreadsheet description frame database can be implemented by importing the database (FIG. 24) into the spreadsheet description method of the file system (FIG. 23).

However, it is much more efficient to build a database using the relational database technology.

Also, it is possible to build a database based on the relational database description method to provide metadata frames for editors and to import spreadsheets for statistical results processing.

In addition, services using NoSQL databases such as Mongo DB other than the relational database are also possible.

FIG. 18 is a diagram of the metadata items according to the ontology representation for defining and extracting the metadata for "public opinion poll execution" in the automatic opinion collecting system according to an embodiment of the present invention.

Figure 19:
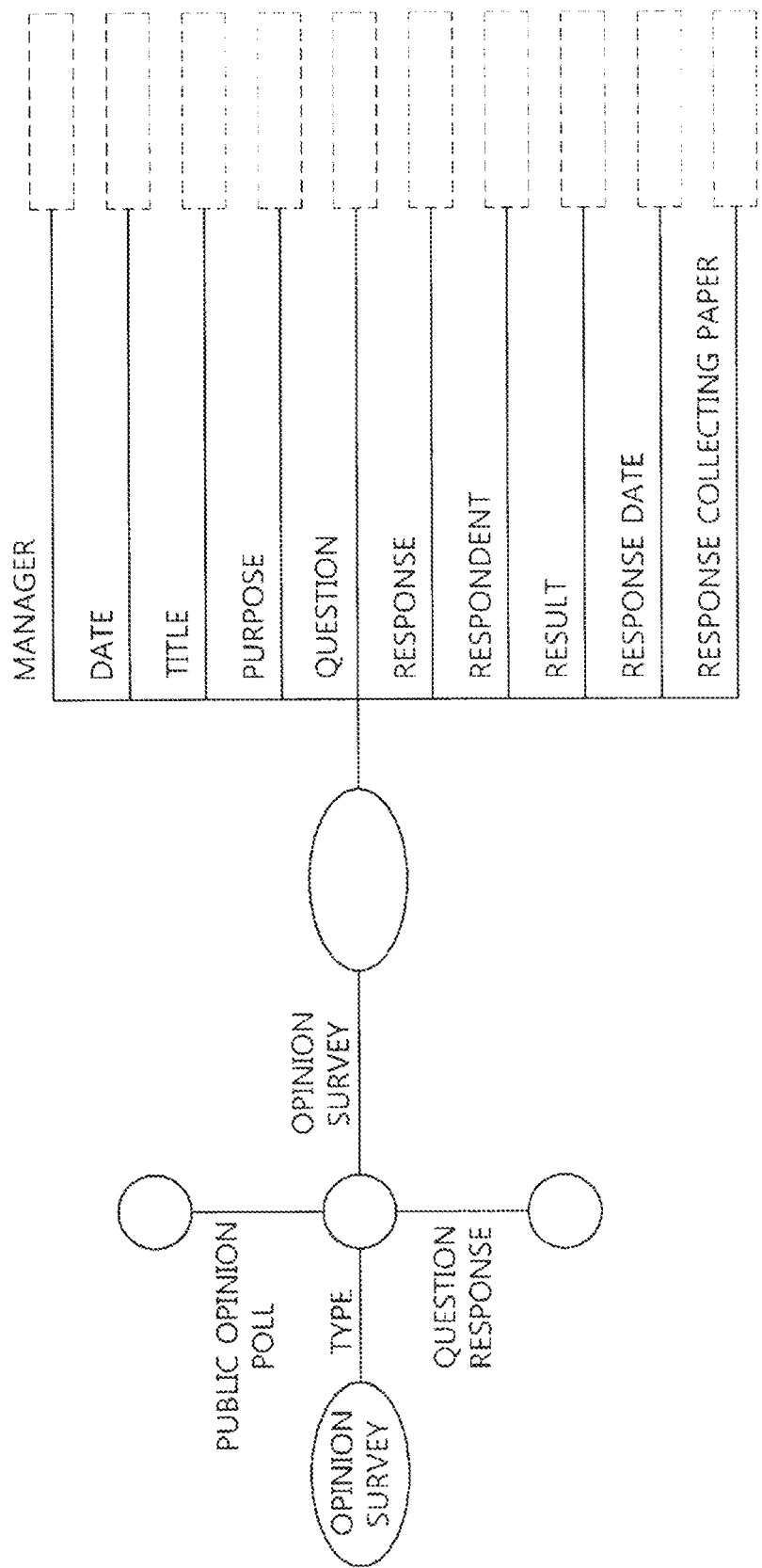

FIG. 19 is a diagram of the metadata frame according to the ontology representation with the RDF, and FIG. 20 is a diagram of the metadata frame according to the ontology representation with the XML. FIG. 21 is a diagram of a metadata frame according to the ontology representation with the relational data model.

FIG. 22 is a diagram of an example for reversely converting the reply contents of the table type to the metadata description frame. This is the function of the metadata frame reverse converter 160 and corresponds to the reply contents of FIG. 8 described using the XML which is one of the metadata description frame representations.

The following describes an embodiment of a specific implementation of constructing a metadata frame represented by the relational database model of FIG. 21 as a metadata description frame database. The database implementation method of the relational database model uses SQL, which is the relational database standard language.

FIG. 27 is an SQL program that generates the metadata frame in the table format of FIG. 21 as a database.

In the SQL program of the above embodiment, the name of the database to be built is CREATE DATABASE sample 1. The table of the metadata frame in FIG. 21 is defined as SQL CREATE TABLE sample 11. Also, metadata and metadata items are defined as name, question, answer, answertype, date, etc. in SQL TABLE.

FIG. 28 is the SQL for constructing the designed metadata frame as a database. The metadata frame composed of the metadata and metadata items is constructed as a metadata description frame database using the metadata description frame method of the relational database data model.

Figure 29:
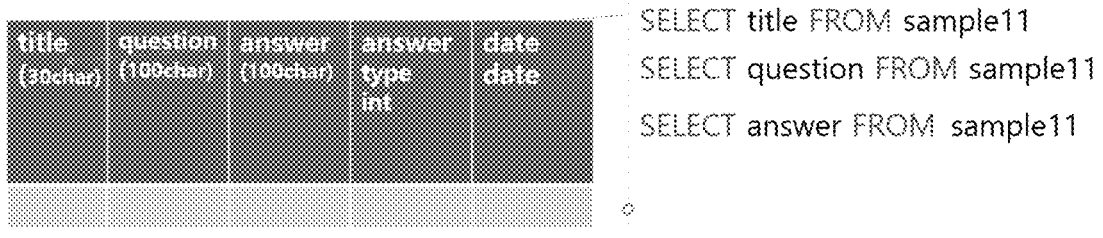
FIG. 29 is a program for generating the editor's metadata frame from the metadata description frame database constructed with the program of FIG. 27 with SQL compiler.

FIG. 29 is a program for generating the editor's metadata frame from the metadata description frame database constructed with the program of FIG. 27 with a SQL compiler, and FIG. 29 is a program to extract metadata and metadata items from the fields (metadata description frame) in the database to regenerate the recorded metadata and metadata items of the editor's metadata frame by the SQL compiler.

Figure 30:
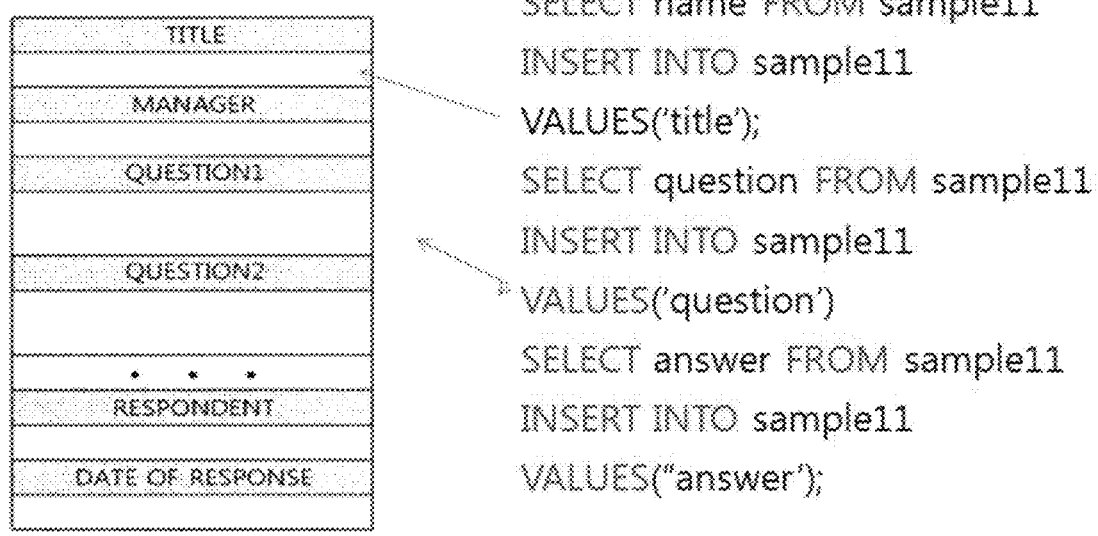
FIG. 30 is an example of an SQL program of a content generator (140 in FIG. 2).

FIG. 30 is a SQL program of the content generator (140 in FIG. 2) that receives the user's actual metadata corresponding to the extracted metadata and metadata items and stores the metadata in the metadata description frame database, respectively.

The user interface of the content generator is the editor's metadata frame.

The editor's metadata frame of the present invention is a table type user interface, and the editor's metadata frame appearance is programmed to be produced as a web page suitable for each information device screen using HTML5 and CSS3 programs.

And the generated editor's metadata frame is provided and displayed to the user's devices including PC, smartphone, and tablet in the devices' suitable page forms from the service server simultaneously as shown in the FIG. 1.

Another technical feature of the present invention is to provide a management system of the metadata description frame database for generating and storing contents of a user-customized survey or election service.

A database management system (DBMS) is a software package designed to define, manipulate, retrieve and manage data in a database. The DBMS generally manipulates the data itself, the data format, field names, record structure, and file structure. It also defines rules to validate and manipulate this data. The configuration of the metadata description frame database management system of the user-customized survey or election service system of the present invention is as follows.

The user-customized survey or election service system of the present invention generates the editor's metadata frames capable of inputting metadata contained in the user-customized survey or election contents and creating contents.

The service system of the present invention includes the metadata description frame database capable of storing created user contents and a database management system that defines, manipulates, retrieves, and manages data in the metadata description frame database.

The data definition is a function for specifying the type, structure, usage method, constraints, etc. of metadata and metadata items to be stored in the metadata description frame database of the user-customized service or election service system as shown in FIG. 27.

Figure 26:
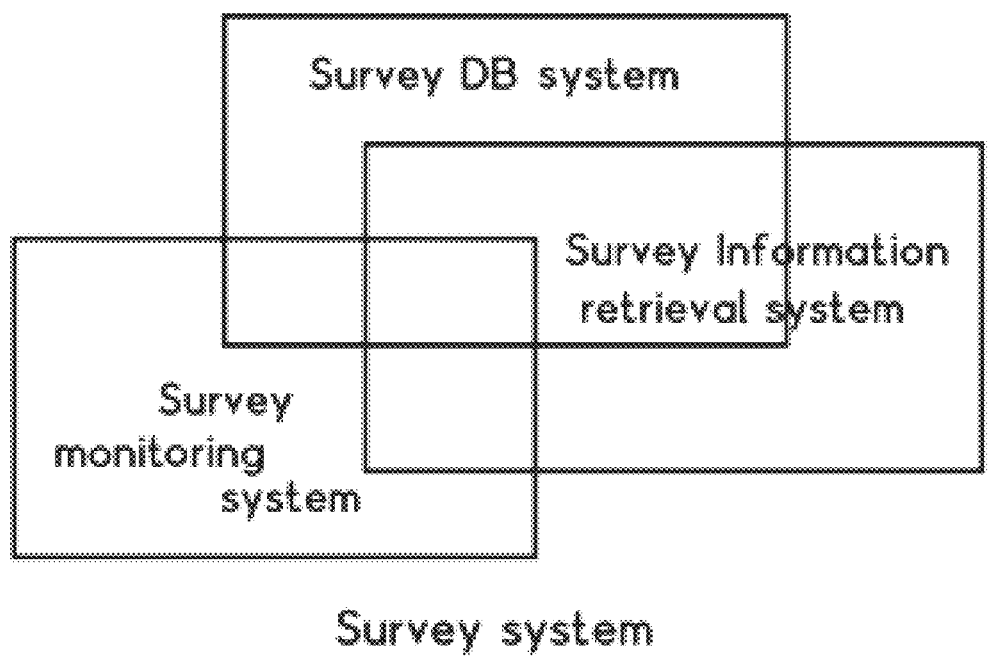
FIG. 26 is a diagram of a database-based system for automatically collecting opinions according to an embodiment of the present invention, which is a combination of a survey information retrieval system and a survey monitoring system.

The data manipulation refers to an interface means between a user and a database in order to systematically process search, update, insertion, deletion, etc. of contents or result data accumulated in the user-customized survey or election service system as shown in FIG. 26.

In addition, the data management function refers to a processing related to the sharing of data stored in the stored metadata description frame database of the user-customized survey or election service system as shown in FIG. 2 and FIG. 26.

Figure 31:
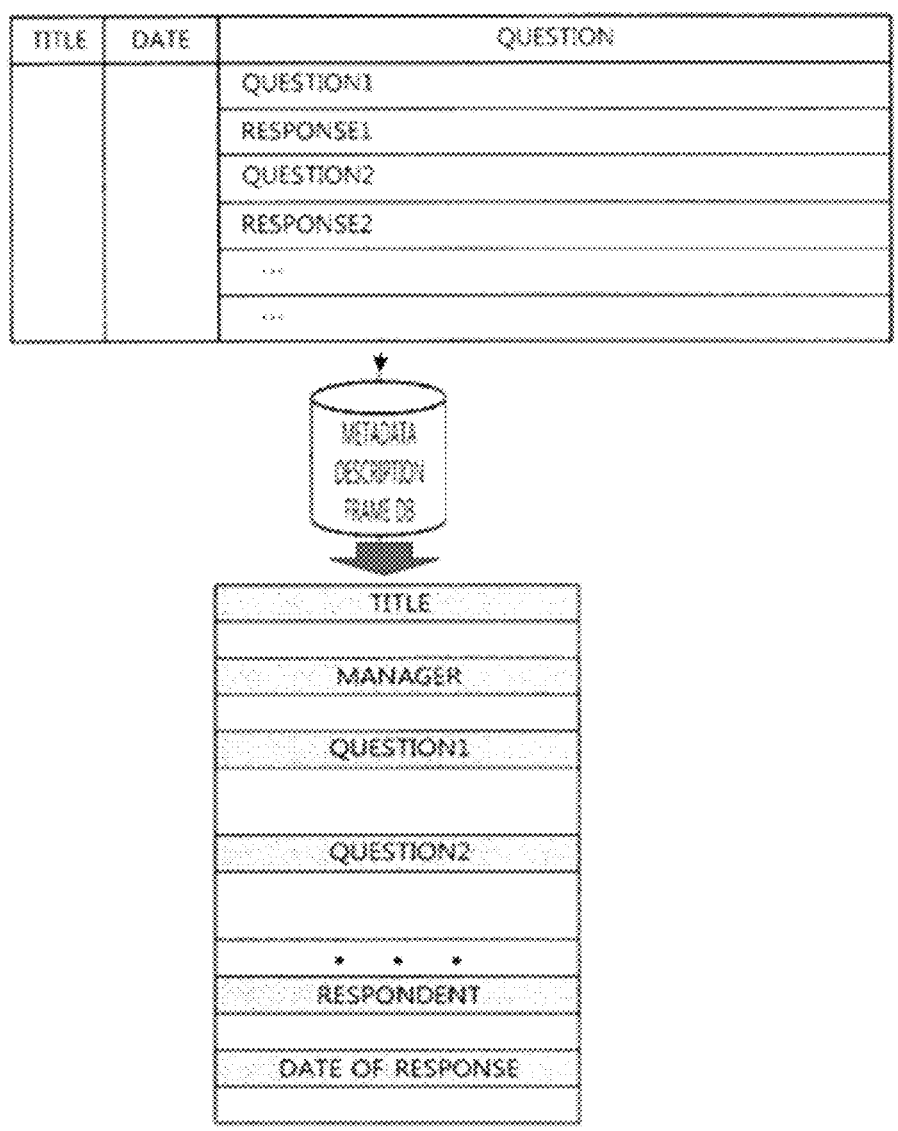
FIG. 31 is an embodiment of a metadata frame converter (125 in FIG. 2).

FIG. 31 shows an embodiment of the metadata frame converter (S125) of FIG. 2.

After constructing the metadata frame of FIG. 21 as a metadata description frame database, a process for selecting metadata and metadata items from the metadata description frame database and generating it as an editor's metadata frame (FIG. 10) of a user interface is illustrated.

The user-customized service of the present invention can provide to the user's information devices as a mobile cloud app or a native app.

The native mobile app of the user's customized survey or election service of the present invention can create three different versions of the same mobile app for the iOS, Android, and Windows devices.

Also, the mobile app of the user's customized survey or election service of the present invention can provide any user's information device having a browser and Internet connection and can use it.

For reference, "ex" in the aforementioned drawings is a "prefix" indicating the metadata, and is hypothetical.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A system for providing a user-customized survey or election service based on a mobile cloud using wired or wireless networks, comprising:
   a service server; and
   a plurality of portable information devices including mobile phones,
   wherein the service server further comprising:
      a central processing unit (CPU);
      a memory device; and
      a database (DB) system,
   wherein the plurality of portable information devices are equipped with hardware and software for processing information related to the user-customized survey or election service,
   wherein a manager's metadata frame is provided on the plurality of portable information devices to input and generate user-customized survey or election service contents,
   wherein the manager's metadata frame is created with the steps comprising:
      designing a metadata frame indicating a relationship between the user-customized survey or election service and metadata items, wherein designing the metadata frame comprising classifying and organizing the metadata items using ontology comprising word representations corresponding to the metadata items required for the user-customized survey or election service;
      databasing the metadata frame composed of the metadata items into a metadata description frame database using a metadata frame description method by a service provider;
         wherein the metadata description frame method for databasing the metadata frame composed of the metadata items into the metadata description frame database uses at least one of the description method among 1) a description method by a Resource Description Framework (RDF), 2) an eXtensible Hyper Text Markup Language (XHTML) or XML (eXtensible Markup Language) description method, 3) a database data model description method, and 4) a spreadsheet description method,
      extracting the metadata items to be included in the editor's metadata frame of the contents from the metadata description frame database using database query language on the service server;
      creating the manager's metadata frame which is a user interface with a programmed table type in order for the manager's actual data for the extracted metadata items are entered; and
      presenting the created manager's metadata frame to the plurality of portable information devices,
   wherein the manager's metadata frame is configured to be used to input the manager's actual data into each of metadata items in the manager's metadata frame displayed on the plurality of portable information devices to generate the user-customized survey or election contents,
   wherein the manager's metadata frame is provided on the plurality of portable information devices by the service server, and
   wherein the manager can input, attach, or edit text or photo content to be included in the user-customized survey or election contents in the manager's metadata frame.

2. The system according to claim 1, wherein the manager's metadata frame is programmed to be produced as a web page suitable for screens on the plurality of portable information devices using HTML (Hypertext Markup Language) and CSS (Cascading Style Sheets) programs.

3. The system according to claim 1, wherein the user-customized survey or election service is a mobile cloud app, or a mobile web app-based or native app service.

4. A method for providing a user-customized survey or election service based on a mobile cloud using wired or wireless networks with a system, the system comprising:
   a service server; and
   a plurality of portable information devices including mobile phones,
   wherein the service server further comprising:
      a central processing unit (CPU);
      a memory device; and
      a database (DB) system,
   wherein the plurality of portable information devices are equipped with hardware and software for processing information related to the user-customized survey or election service,
   wherein an manager's metadata frame is provided on the plurality of portable information devices to input and generate user-customized survey or election service contents,
   wherein the manager's metadata frame is created with the steps comprising:
      designing a metadata frame indicating a relationship between the user-customized survey or election service and metadata items, wherein designing the metadata frame comprising classifying and organizing the metadata items using ontology comprising word representations corresponding to the metadata items required for the user-customized survey or election service;

databasing the metadata frame composed of the metadata items into a metadata description frame database using a metadata frame description method by a service provider;

wherein the metadata description frame method for databasing the metadata frame composed of the metadata and metadata items into the metadata description frame database uses at least one of the description method among 1) a description method by a Resource Description Framework (RDF), 2) an eXtensible Hyper Text Markup Language (XHTML) or XML (eXtensible Markup Language) description method, 3) a database data model description method, and 4) a spreadsheet description method, extracting the metadata items to be included in the manager's metadata frame of the contents from the metadata description frame database using database query language on the service server;

creating the manager's metadata frame which is a user interface with a programmed table type in order for the manager's actual data for the extracted metadata items are entered; and presenting the created manager's metadata frame to the plurality of portable information devices, wherein the manager's metadata frame is configured to be used to input the manager's actual data into each of metadata items in the manager's metadata frame displayed on the plurality of portable information devices to generate the user-customized survey or election contents, wherein the manager's metadata frame is provided on the plurality of portable information devices by the service server, and wherein the manager can input, attach, or edit text or photo content to be included in the user-customized survey or election contents in the manager's metadata frame.

5. The method according to claim 4, wherein the manager's metadata frame is programmed to be produced as a web page suitable for screens on the plurality of portable information devices using HTML (Hypertext Markup Language) and CSS (Cascading Style Sheets) programs.

6. The method according to claim 4, wherein the user-customized survey or election service is a mobile cloud app, or a mobile web app-based or native app service.

\* \* \* \* \*